US012802240B1

(12) United States Patent
Patel et al.

(10) Patent No.: US 12,802,240 B1
(45) Date of Patent: Nov. 17, 2026

(54) FRAME SELECTION

(71) Applicant: SimpliSafe, Inc., Boston, MA (US)

(72) Inventors: Denim Patel, Nashua, NH (US); Shreyas Kamath Kalasa Mohandas, Sunnyvale, CA (US); Danielle Dean, Westford, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 19/343,732

(22) Filed: Sep. 29, 2025

(51) Int. Cl.
*G06V 20/40* (2022.01)
*G06T 7/246* (2017.01)

(52) U.S. Cl.
CPC .............. *G06T 7/246* (2017.01); *G06V 20/46* (2022.01); *G06T 2207/10016* (2013.01)

(58) Field of Classification Search
CPC .......... G06T 7/246; G06T 2207/10016; G06V 20/46
See application file for complete search history.

(56) References Cited

U.S. PATENT DOCUMENTS 7,843,512 B2 * 11/2010 Mohamed ............. G06F 16/786 348/700
9,373,054 B2 * 6/2016 Loui ...................... G06V 20/46
10,607,098 B2 * 3/2020 Liu ........................ G06V 10/40
2011/0292288 A1 * 12/2011 Deever .............. H04N 21/8549 348/590
2012/0027295 A1 * 2/2012 Shao ....................... G06F 16/70 382/170
2015/0098685 A1 * 4/2015 Hu ......................... H04N 7/183 386/224
2017/0124400 A1 * 5/2017 Yehezkel Rohekar ...................... G06F 16/00
2024/0257360 A1 * 8/2024 Xu .......................... G06T 7/248
2025/0371868 A1 * 12/2025 Riise .................... G06V 10/761

OTHER PUBLICATIONS

Varghese, Jina, and KN Ramachandran Nair. "An algorithmic approach for general video summarization." 2015 Fifth International conference on advances in computing and communications (ICACC). IEEE, 2015. (Year: 2015).*
Li, WenLin, et al. "Video summarization based on mutual information and entropy sliding window method." Entropy 22.11 (2020): 1285. (Year: 2020).*
Sappa et al., An Edge-Based Approach to Motion Detection, Lecture Notes in Computer Science, pp. 563-570 (May 2006).
Meng et al., Scene Change Detection in a MPEG Compressed Video Sequence, IS&T/SPIE Symposium Proceedings vol. 2419, Feb. 1995.

* cited by examiner

*Primary Examiner* — Stephen R Koziol
*Assistant Examiner* — Joshua Chen
(74) *Attorney, Agent, or Firm* — Secant IP, P.L.L.C.

(57) ABSTRACT

A method comprising identifying at least one sequence of frames within a series of frames, determining, for individual frames within the a sequence, motion between the individual frames and at least one other frame prior to the individual frames in the sequence, selecting at least one frame of the individual frames based on the motion, and assigning the at least one selected frame to represent at least a portion of the sequence of frames.

24 Claims, 18 Drawing Sheets

1100

1500

FRAME SELECTION

TECHNICAL FIELD

Aspects of the technologies described herein relate to security systems and methods, more particularly, to data analysis systems and methods utilizing the same.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

This disclosure is directed to methods and systems for identifying at least one sequence of frames within a series of frames. One example method which may include the steps of determining, for individual frames within the sequence, motion between the individual frames and at least one other frame prior to the individual frames in the sequence, selecting at least one frame of the individual frames based on the motion, and assigning the at least one selected frame to represent at least a portion of the sequence of frames.

Examples of the method can incorporate one or more of the following features.

The method can further include determining motion between frames in the series, wherein identifying the at least one sequence includes identifying a plurality of sequences of frames based on quantifications of the motion between the frames in the series.

The method can further include identifying the plurality of sequences based on the quantifications includes calculating a motion density between consecutive frames in the series.

The method can further include calculating first scores for the individual frames based on the determined motion between the individual frames and the one or more other frames.

In some examples of the method, selecting the at least one frame includes selecting the at least one frame based on the first scores.

The method can further include determining the motion between the individual frames and the one or more other frames includes determining, for each frame within the at least one sequence, motion between the frame and every other frame with a lower ordinal value in the at least one sequence.

In some examples of the method, calculating the first scores for the individual frames includes calculating, for each frame within the at least one sequence, an amount of motion based on the motion between the frame and every other frame with a lower ordinal value in the at least one sequence.

The method can further include rendering, via a user interface, the at least one frame.

The method can further include classifying an event depicted in the series based on the at least one frame.

The method can further include generating second scores for the individual frames based on the event.

The method can further include calculating first scores for the individual frames based on the determined motion between the individual frames and the one or more other frames and producing third scores for the individual frames based on the first scores and the second scores of each frame.

Another example method comprises identifying at least one sequence of frames within a series of frames, calculating, for individual frames within the sequence, respective changes in pixels between the individual frames and every other frame prior to the individual frames in the sequence, selecting at least one frame of the sequence based on the respective changes, and assigning the at least one selected frame to represent the sequence of frames.

The method can further include calculating changes in pixels between frames in the series, wherein identifying the sequence includes identifying a plurality of sequences of frames based on the changes in pixels between the frames in the series.

In some examples of the method, calculating changes in pixels includes determining motion between frames in the series, and identifying the plurality of sequences based on the changes in pixels includes identifying the plurality of sequences based on quantifications of the motion.

In some examples of the method identifying the plurality of sequences based on the quantifications of motion includes calculating a motion density between consecutive frames in the series.

The method can further include calculating first scores for the individual frames based on the respective changes.

In some examples of the method, selecting the at least one frame includes selecting the at least one frame based on the respective first scores.

In some examples of the method, calculating the respective changes in pixels between the individual frames and the one or more other frames includes calculating, for each frame within the sequence, respective changes in pixels between the frame and every other frame with a lower ordinal value in the sequence.

In some examples of the method, calculating the respective first scores for the individual frames includes calculating, for each frame within the sequence, an amount of changes in pixels based on the respective changes in pixels between the frame and every other frame with a lower ordinal value in the sequence.

The method can further include rendering, via a user interface, the at least one frame.

The method can further include classifying an event depicted in the series based on the at least one frame.

The method can further include generating a second score based on the event and/or a respective change in pixels calculated for the at least one frame.

The method can further include calculating first scores for the individual frames based on the respective changes, producing third scores for the individual frames based on the first scores and the second scores of each frame, and selecting at least one frame further based on the third scores.

A further example is a system including an image capture device configured to capture a series of frames and a processor configured to interoperate with the image capture device to identify at least one sequence of frames within the series of frames, determine, for individual frames within the sequence of frames, motion between the individual frames and at least one other frame prior to the individual frames in the sequence, select at least one frame of the individual frames based on the determined motion, and assign the at least one selected frame to represent at least a portion of the sequence of frames.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

DETAILED DESCRIPTION

Figure 1:
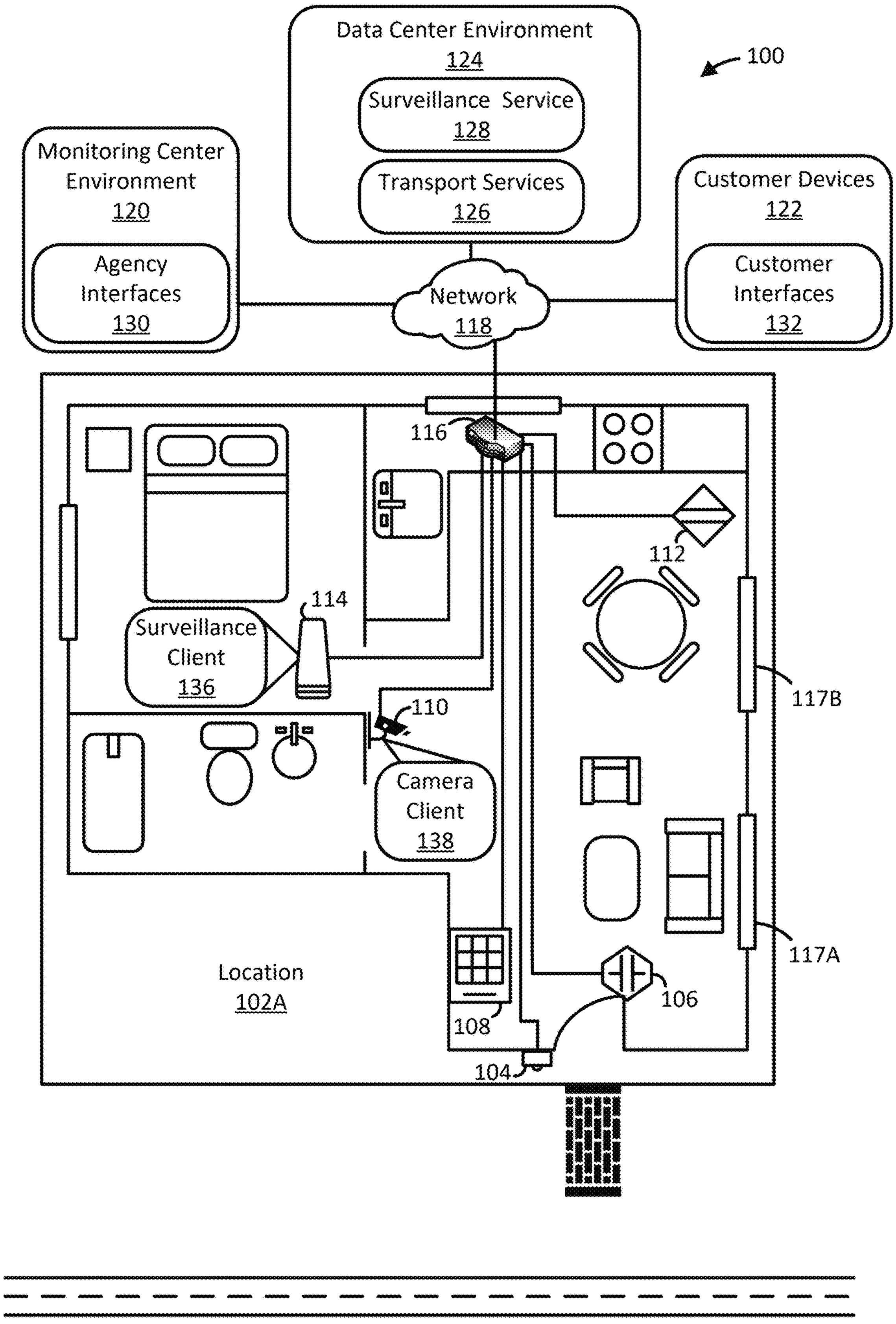
FIG. 1 is a schematic diagram of a security system, according to some examples described herein.

As summarized above, at least some examples disclosed herein are directed to systems and processes for analyzing data gathered from monitoring equipment (i.e., cameras, sensors, etc.). Various examples relate to analyzing video data or to processing video data in anticipation of analysis. In some instances, video data from monitoring equipment may encode similar information in sequentially captured frames. In those instances, it may be inefficient to process and/or analyze every frame of a sequence where each frame only contains marginally different information from other nearby frames in the sequence. Instead, it may be more efficient to focus processing on frames encoding different or more interesting events or information compared to other frames in the sequence ("interesting frames"). Interesting information may include events different from those normally captured, or similar to other events previously identified as interesting. For example, if a system is monitoring an area for visitors or trespassers, any movement of a person in the area may be interesting. If the system is monitoring a public area, detecting one or more people moving differently than usual (e.g., going the wrong way, running instead of walking, etc.) may be interesting.

One approach is to analyze only a sample of frames, such as every $5^{th}$ frame, every $10^{th}$ frame, or another interval. This approach results in reduced processing overhead but may suffer from difficulty detecting events occurring within intervals or in selecting interesting frames for a number of reasons, including difficulties in selecting ideal frames which depict events and in selecting frames which depict brief events at all. For instance, if an event occurs entirely within a frame interval (i.e., a system analyzing only every 10th frame and an event captured by seven of the frames), the event may not be analyzed at all. Even if one of the frames depicting the event is sampled, other frames which were not selected may show the event better (i.e., more clearly, at a better angle, etc.).

Another approach is to perform constant image-to-image comparisons of consecutive frames to identify significant changes in pixels between consecutive frames, where frames having a difference above a threshold compared to preceding frames are more likely to be interesting frames. This method also presents limitations. For example, this method may experience undue sensitivity to variations in one or more of image quality, scene brightness, contrast, illumination, and image noise, and thus leading for false positives. These and other scene variations may cause signal noise in the form of moderate to significant pixel change between adjacent frames in a sequence, but do not indicate the motion of objects or individuals that would be more interesting in a monitoring application. Such false positives, where a system mistakenly determines that meaningless scene variations are meaningful, may result in unnecessary downstream processing of the sequence, even when no salient information is encoded in them. This can unnecessarily increase the computational load of monitoring and lead to other consumption of system resources (i.e., agent time and attention reviewing false positives).

To address the deficiencies noted above, among others, described herein are systems and processes that correctly identify interesting frames and further process those interesting frames to advantageous effect. For instance, in some examples, these systems and processes utilize frame differencing and/or thresholding to produce one or more motion masks, identifying and isolating regions of movement within a video frame while disregarding static sections of the frame. A motion mask may be used to pinpoint moving objects within a video scene with specificity, for example, suppose there is footage of leaves of a tree shaking because of wind but the trunk and branches remain motionless; using the enclosed method, a system can be configured to produce an individual motion mask for every leaf that moves, rather than one motion mask for the entire tree. In that example, leaf-sized motion masks may be discarded as image noise where a tree-sized motion mask may prompt further processing. When motion masks are produced, an appearance change score may be generated for individual frames based on a size (e.g., the number of constituent pixels or percentage of the frame covered), or an intensity (e.g., the frequency or magnitude of pixel changes) of regions identified by the motion masks. In this way, individual frames may be assigned a numerical appearance change score based on the motion masks present in the frames, where those frames with the largest instances of motion are most likely to contain salient information (i.e., information on interesting events that happen within the space monitored by a device capturing the frames). When the frames of a sequence are analyzed, any frames having appearance change scores above a given threshold may be identified as interesting frames.

While frame analysis and motion masking techniques may aid in identifying interesting frames or regions of video, these processes alone cannot analyze selected frames to determine their content. In order to further determine a scene's context, a number of frames, which may be an entire sequence of frames or may be a subset of selected interesting frames, may be given to another system, such as a system employing artificial intelligence, for example an artificial neural network (ANN), that may semantically describe and/or semantically score objects captured in a frame or sequence of frames. Example ANNs may be developed using frameworks such as PyTorch and TensorFlow, among others. Some objects, such as individuals, may be more interesting than some other objects, such as debris, even when the motion of either is large enough to grant a frame an appearance change score above the threshold. When an image depicts more interesting objects, or shows objects doing more interesting things, like an individual moving or a door opening, the ANN may assign a higher semantic score to that image, compared to one showing less interesting objects or action.

The two scores, an appearance change score produced by frame analysis and a semantic score produced by an ANN given a frame or sequence of frames, may be combined to produce a composite score. Frames with a higher relative composite score are more likely to be interesting frames than frames with a lower composite score. The weight given to the constituent scores of a composite score may vary based on the scene observed, the configuration of the monitoring device, the configuration of the overall system, or the types of scores combined to create the composite score.

In some examples, a large language model (LLM) can be used to summarize the content of a given frame or video sequence. In cases where the LLM is given a sequence of frames, it may be configured to summarize the content or events occurring within the sequence. As above, in some cases adjacent frames may encode very similar data, and therefore analyzing each frame may be an inefficient use of processing resources. In some cases, video summarization may be performed on a subset of the sequence of frames. Ideally, this subset includes the most interesting frames of the sequence, so that as much information can be summarized from each frame as possible. Interesting frames may be selected based on the appearance change score, the semantic score, the composite score, or by another method.

Other monitoring devices may also be employed to improve the method of frame scoring. In some instances, a monitoring device includes at least an image sensor (a camera) and a passive infrared detector or other sensor which may detect movement. In those instances, the magnitude of movement detected by the other sensor may contribute to the composite score of a frame captured at the same moment, where more detected movement results in a higher value added to the composite score.

Attaching scores to frames in order to determine the most interesting frames in a sequence may enable a number of different applications. In one example, a frame of the sequence having a high composite score may be selected to serve as a thumbnail (a representative image) for the sequence of frames. In another application, a subset of frames of the sequence having high composite scores may be selected to be given to a LLM for event summarization, which may entail less processing than analyzing the entire sequence. Alternatively the subset of frames having high composite scores may be encoded as a video or GIF file, which may be stored for later analysis or to be viewed by users. In these and other cases, semantic scoring may highlight frames encoding information different from other interesting frames, or which have high appearance change scores relative to nearby frames, even if their appearance change score is lower than some other frames nearer to the frame with the highest appearance change score in the sequence. These and other aspects and examples are discussed in more detail below.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes a monitored location 102A, a monitoring center environment 120, a data center environment 124, one or more customer devices 122, and a communication network 118. The monitored location 102A, the monitoring center environment 120, the data center environment 124, the one or more customer devices 122, and the communication network 118 include one or more computing devices (e.g., as described below with reference to FIG. 16). The one or more customer devices 122 are configured to host one or more customer interface applications 132. The monitoring center environment 120 is configured to host one or more agency interface applications 130. The data center environment 124 is configured to host a surveillance service 128 and one or more transport services 126. The location 102A includes image capture devices 104 and 110, a contact sensor assembly 106, a keypad 108, a motion sensor assembly 112, a base station 114, and a router 116. The base station 114 hosts a surveillance client 136. The image capture device 110 hosts a camera client 138. The security devices disposed at the location 102A (e.g., devices 104, 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc. Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the agency interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g., via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the agency interfaces 130, and/or the customer interfaces 132, although the pixel resolution and frame rate may vary depending on the capabilities of the devices. Where the image capture devices 104 and 110 have sufficient processing capacity and available power, the image capture devices 104 and 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the agency interfaces 130, and the customer interfaces 132 separately from the surveillance client 136 via execution of the camera client 138. These communications can include sensor data generated by the image capture device 110 and/or commands to be executed by the image capture device 110 sent by the surveillance service 128, the agency interfaces 130, and/or the customer interfaces 132. The commands can include, for example, requests for interactive communication sessions in which monitoring personnel and/or customers interact with the image capture device 110 via the agency interfaces 130 and the customer interfaces 132. These interactions can include requests for the image capture device 110 to transmit additional sensor data and/or requests for the image capture device 110 to render output via a user interface (e.g., the user interface 412 of FIGS. 4B and 4C). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alarm state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the agency interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108 or the customer interface application 132, reception of commands from one of the agency interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the agency interfaces 130, and the customer interfaces 132. It should be noted that data stored within any of the data stores disclosed herein may be stored by value or by reference (e.g., via a pointer, address, or other identifier of the data or the data's location).

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera client 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the agency interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the agency interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual agency interfaces 130 are configured to control computing device interaction with monitoring personnel and to execute a variety of programmatic operations in response to the interactions. For instance, in some examples, the agency interface 130 controls its host device to provide information regarding reportable events detected at monitored locations, such as the location 102A, to monitoring personnel. Such events can include, for example, movement or an alarm condition generated by one or more of the location-based devices. Alternatively or additionally, in some examples, the agency interface 130 controls its host device to interact with a user to configure features of the system 100. Further example processes that the agency interface 130 is configured to execute are described below with reference to FIG. 6. It should be noted that, in at least some examples, the agency interfaces 130 are browser-based applications served to the monitoring center environment 120 by webservers included within the data center environment 124. These webservers may be part of the surveillance service 128, in certain examples.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alarm condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Figure 2:
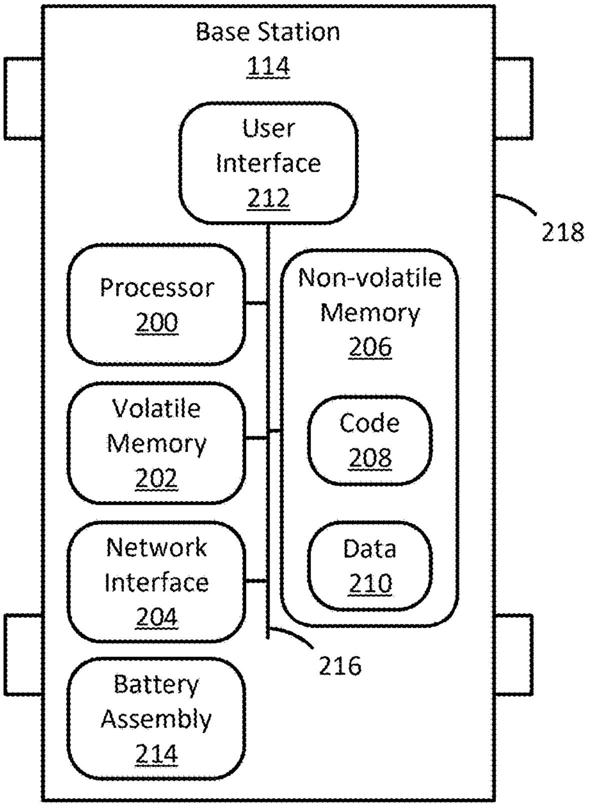
FIG. 2 is a schematic diagram of a base station, according to some examples described herein.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing with the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g., memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol/internet protocol (TCP/IP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit messages to other location-based devices. These messages can include wake messages to request streams of sensor data, alarm messages to trigger alarm responses, or other messages to initiate other operations. Bands that the network interface 204 may utilize for sub-GHz wireless networking include, for example, an 868 MHz band and/or a 915 MHz band. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 dB siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Figure 3:
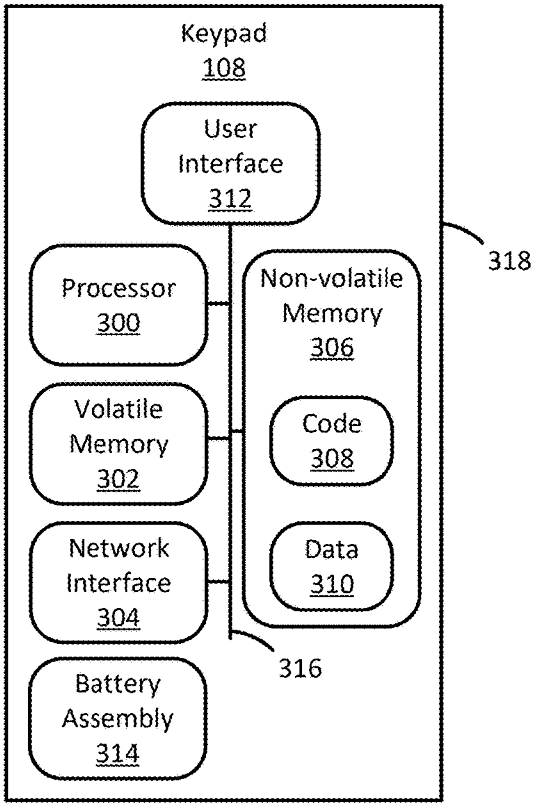
FIG. 3 is a schematic diagram of a keypad, according to some examples described herein.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP/IP, UDP, HTTP, and MQTT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

In some examples, devices like the keypad 108, which rely on user input to trigger an alarm condition, may be included within a security system, such as the security system 100 of FIG. 1. Examples of such devices include dedicated key fobs and panic buttons. These dedicated security devices provide a user with a simple, direct way to trigger an alarm condition, which can be particularly helpful in times of duress.

Figure 4A:
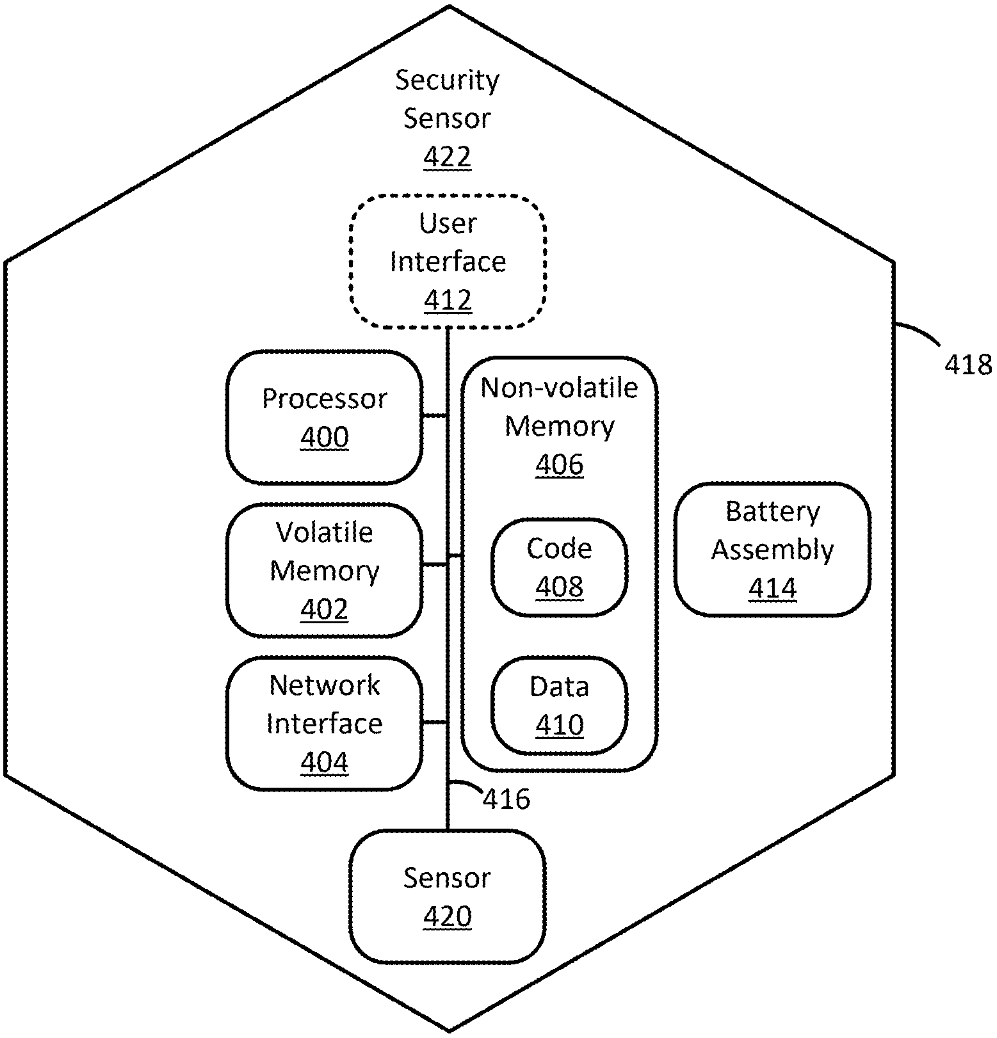
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. Other examples of security sensors 422 include glass break sensors, carbon monoxide sensors, smoke detectors, water sensors, temperature sensors, and door lock sensors, to name a few. As shown in FIG. 4A, the security sensor 422 includes at least one processor 400, volatile memory 402, non-volatile memory 406, at least one network interface

404, a battery assembly 414, an interconnection mechanism 416, and at least one sensor assembly 420. The non-volatile memory 406 stores executable code 408 and a data store 410. Some examples include a user interface 412. As indicated by its rendering in dashed lines, not all examples of the security sensor 422 include the user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP/IP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and/or a temperature or thermographic sensor (e.g., an active and/or passive infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera client 138 of FIG. 1 and can result in manipulated data that is a part of the data store 410.

Figure 4B:
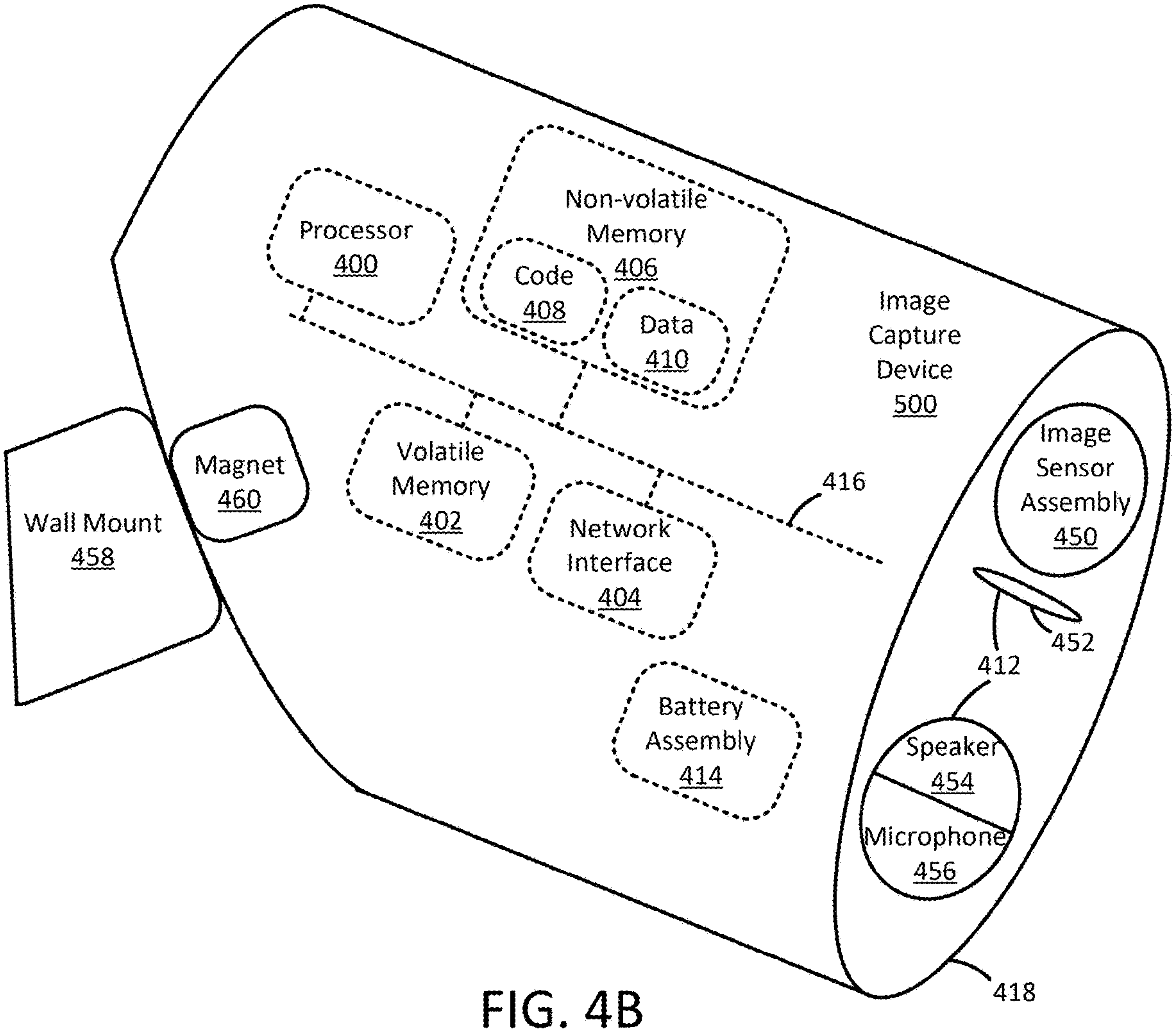
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device 500 are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor (e.g., a charge-coupled device or an active-pixel sensor) and/or a temperature or thermographic sensor (e.g., an active and/or passive infrared (PIR) sensor). The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 dB or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alarm via the siren) or streamed from the base station 114 (or one of the processes 130, 128, or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128, or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A. The image capture device 500 may be a battery-powered outdoor sensor configured to be installed and operated in an outdoor environment, such as outside a home, office, store, or other commercial or residential building, for example.

Figure 4C:
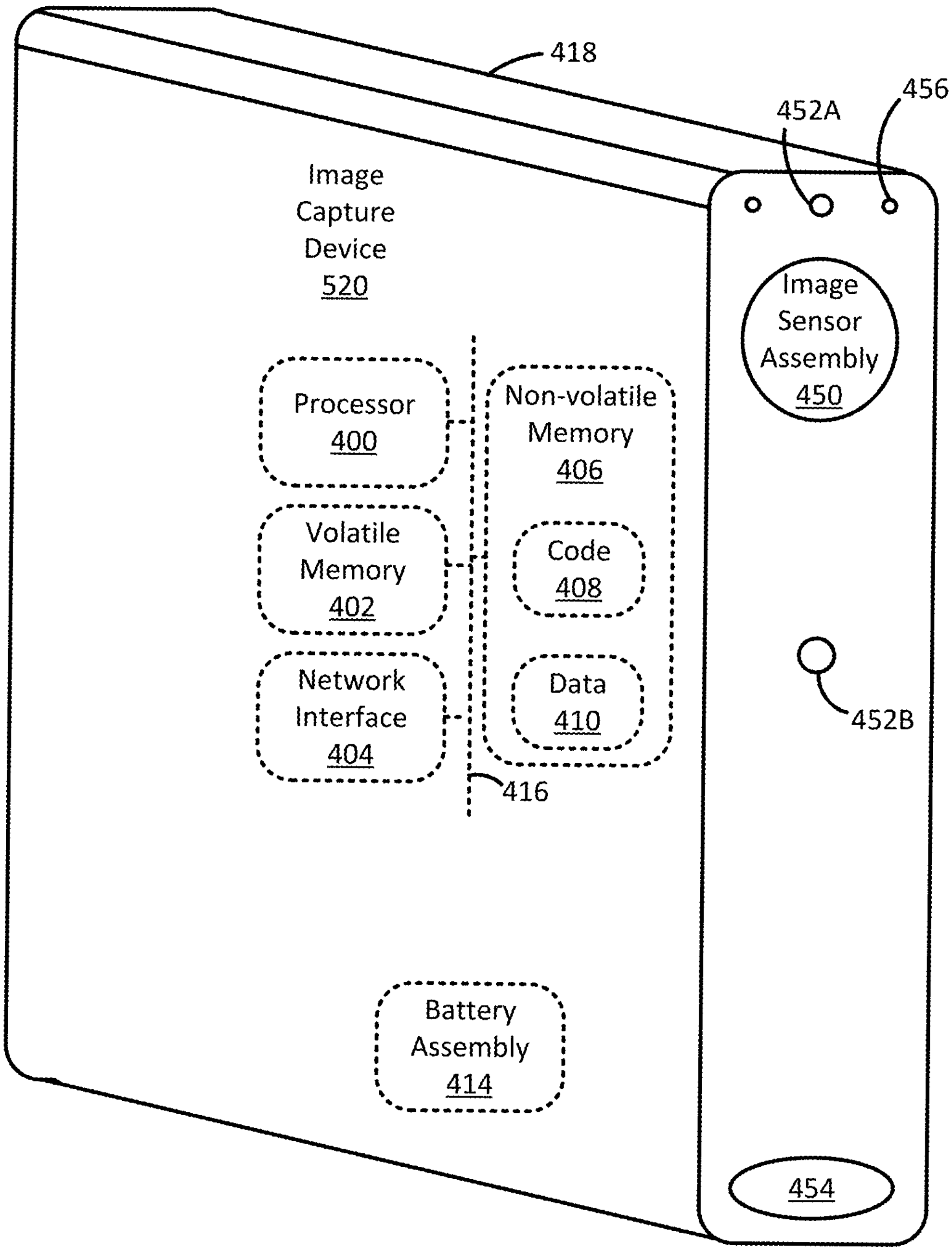
FIG. 4C is a schematic diagram of another image capture device, according to some examples described herein.

Turning now to FIG. 4C, another example image capture device 520 is schematically illustrated. Particular configurations of the image capture device 520 (e.g., the image capture devices 104 and 110) are illustrated in FIG. 1 and described above. As shown in FIG. 4C, the image capture device 520 includes at least one processor 400, volatile memory 402, non-volatile memory 406, at least one network interface 404, a battery assembly 414, and an interconnection mechanism 416. These features of the image capture device 520 are illustrated in dashed lines to indicate that they reside within a housing 418. The non-volatile memory 406 stores executable code 408 and a data store 410. The image capture device 520 further includes an image sensor assembly 450, a speaker 454, and a microphone 456 as described above with reference to the image capture device 500 of FIG. 4B.

In some examples, the image capture device 520 further includes lights 452A and 452B. The light 452A may include a light emitting diode (LED), such as a red-green-blue emitting LED. The light 452B may also include an infrared emitting diode to enable night vision in some examples.

It should be appreciated that in the example of FIG. 4C, the lights 452A and/or 452B, the speaker 454, and the microphone 456 implement an instance of the user interface 412 of FIG. 4A. It should also be appreciated that the image sensor assembly 450 and the lights 452A and/or 452B implement an instance of the sensor assembly 420 of FIG. 4A. As such, the image capture device 520 illustrated in FIG. 4C is at least one example of the security sensor 422 illustrated in FIG. 4A. The image capture device 520 may be a battery-powered indoor sensor configured to be installed and operated in an indoor environment, such as within a home, office, store, or other commercial or residential building, for example.

Figure 5:
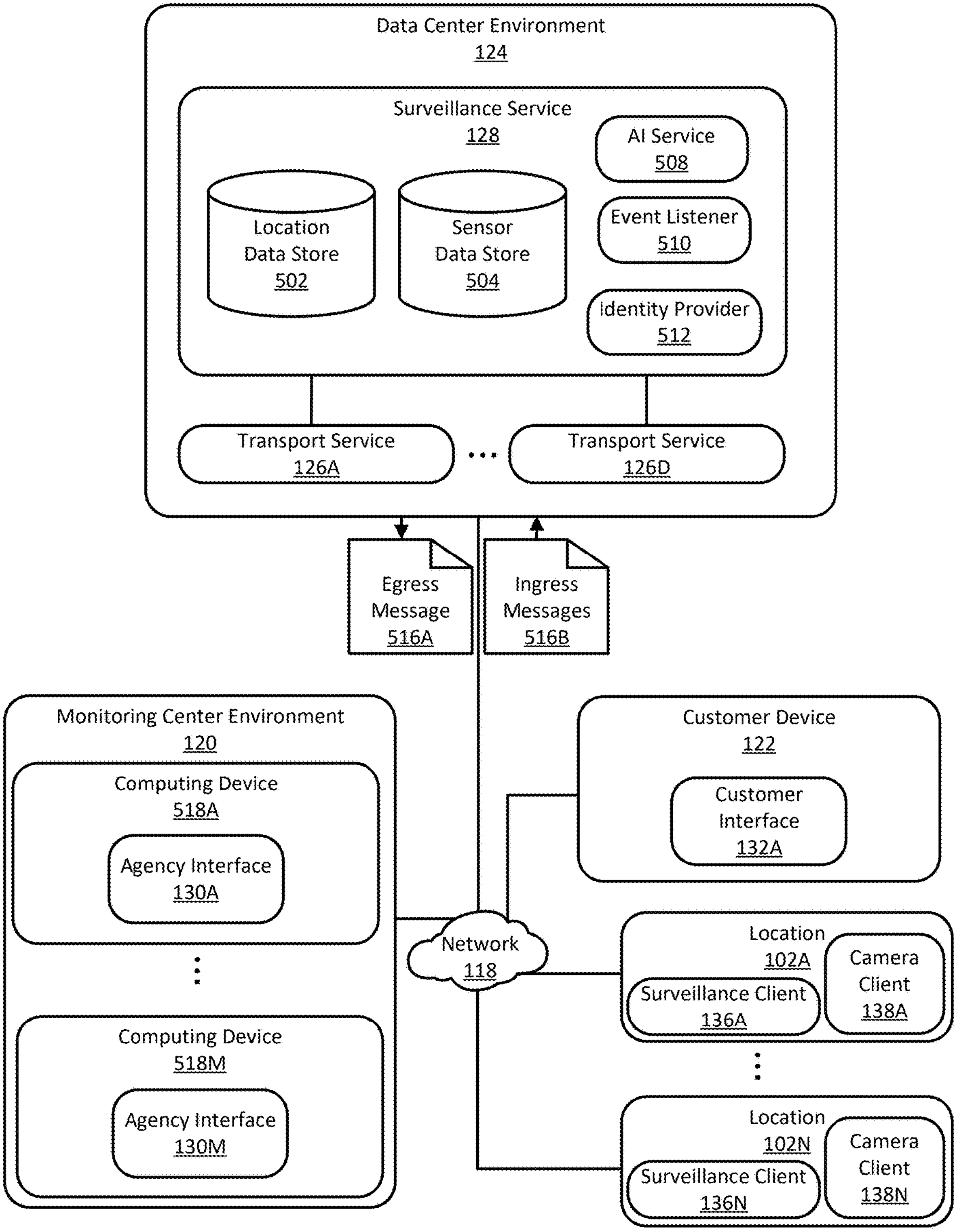
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A through 102N of FIG. 1 (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host agency interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera clients 138A through 138N (collectively referred to as the camera clients 138).

As shown in FIG. 5, the transport services 126 are configured to process ingress messages 516B from the customer interface 132A, the surveillance clients 136, the camera clients 138, and/or the agency interfaces 130. The transport services 126 are also configured to process egress messages 516A addressed to the customer interface 132A, the surveillance clients 136, the camera clients 138, and the agency interfaces 130. The location data store 502 is configured to store, within a plurality of records, location data in association with identifiers of customers (e.g., user account identifiers) for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) separately from other location data but in association with identifiers of locations and timestamps at which the sensor data was acquired. In some examples, the sensor data store 504 is optional and may be used, for example, where the sensor data housed therein has specialized storage or processing requirements.

Continuing with the example of FIG. 5, the AI service 508 is configured to process sensor data (e.g., images and/or sequences of images) to identify movement, human faces, and other features within the sensor data. The event listening service 510 is configured to scan location data transported via the ingress messages 516B for event data and, where event data is identified, execute one or more event handlers to process the event data. In some examples, the event handlers can include an event reporter that is configured to identify reportable events and to communicate messages specifying the reportable events to one or more recipient processes (e.g., a customer interface 132 and/or an agency interface 130). In some examples, the event listening service 510 can interoperate with the AI service 508 to identify events from sensor data. The identity provider 512 is configured to receive, via the transport services 126, authentication requests from the surveillance clients 136 or the camera clients 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera client 138 can receive, store, and include the security token in subsequent ingress messages 516B, so that the transport service 126A is able to securely process (e.g., unpack/parse) the packages included in the ingress messages 516B to extract the location data prior to passing the location data to the surveillance service 128.

Continuing with the example of FIG. 5, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera clients 138 are configured to generate and communicate, to the surveillance service 128 via the network 118, ingress messages 516B that include packages of location data based on sensor information received at the locations 102.

Continuing with the example of FIG. 5, the computing devices 518 are configured to host the agency interfaces 130. In some examples, individual agency interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the agency interfaces 130 and the customer interface 132 are described further below with reference to FIG. 6.

Figure 6:
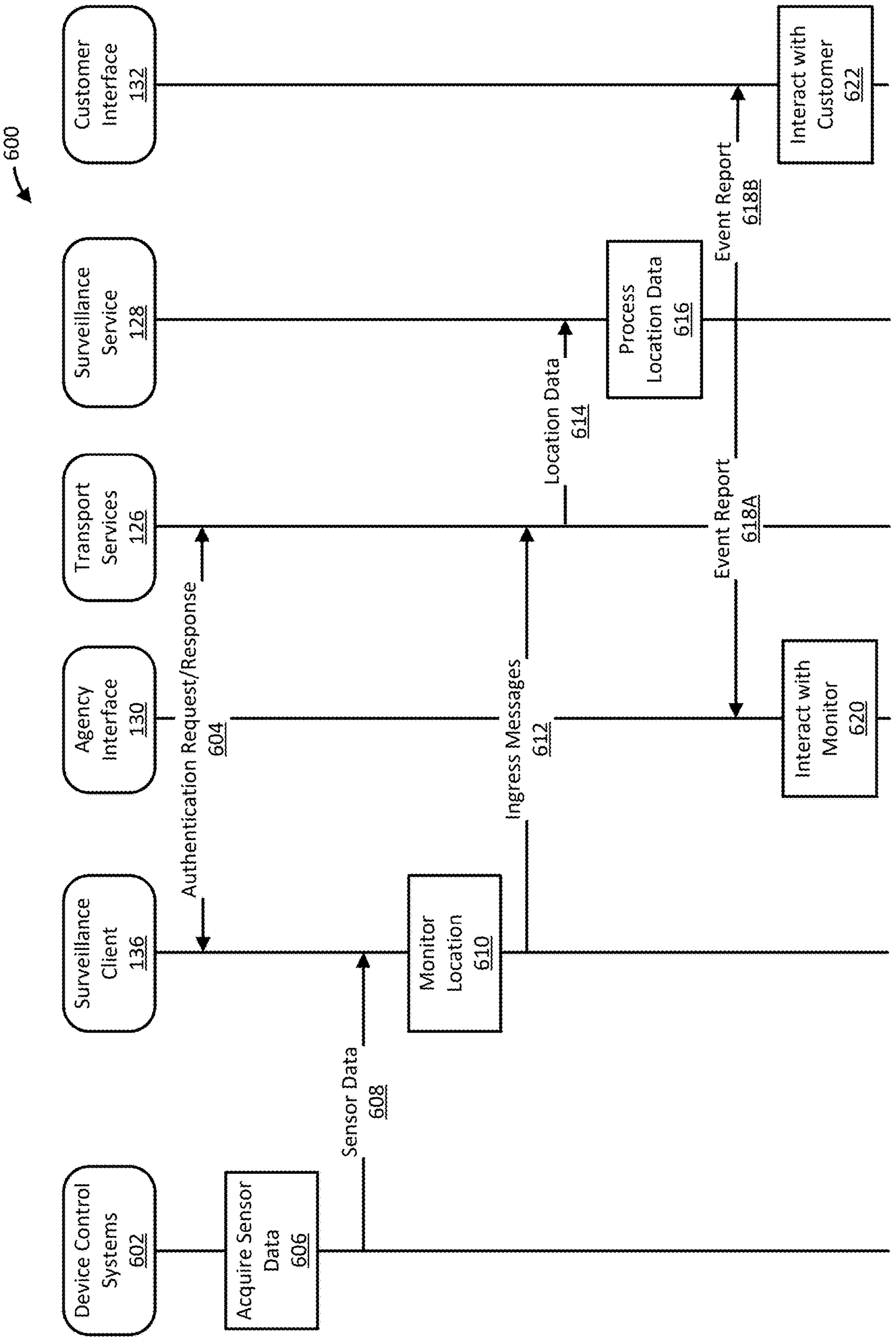
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., one or more of the code sets 208, 308, or 408 of FIGS. 2-4C) implemented by at least one processor (e.g., one or more of the processors 200, 300, or 400 of FIGS. 2-4C). The DCS code can include, for example, a camera client (e.g., the camera client 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of an agency interface (e.g., the agency interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the identity provider generates a security token and transmits the security token to the transport service 126. The transport service 126, in turn, receives a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 600, one or more DCSs 602 hosted by one or more location-based devices acquire 606 sensor data descriptive of a location (e.g., the location 102A of FIG. 1). The sensor data acquired can be any of a variety of types, as discussed above with reference to FIGS. 1-4C. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alarms (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable events and, if so, communicates an event report 618A and/or 618B to the agency interface 130 and/or the customer interface 132. A reportable event may be an event of a certain type (e.g., break-in) or an event of a certain type that satisfies additional criteria. For example, movement within a particular zone combined with a threat score that exceeds a threshold value may be a reportable event, while movement within the particular zone combined with a threat score that does not exceed a threshold value may be a non-reportable event. The event reports 618A and/or 618B may have a priority based on the same criteria used to determine whether the event reported therein is reportable or may have a priority based on a different set of criteria or rules.

Continuing with the process 600, the agency interface 130 interacts 620 with monitoring personnel through, for example, one or more GUIs. These GUIs may provide details and context regarding one or more reportable events.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
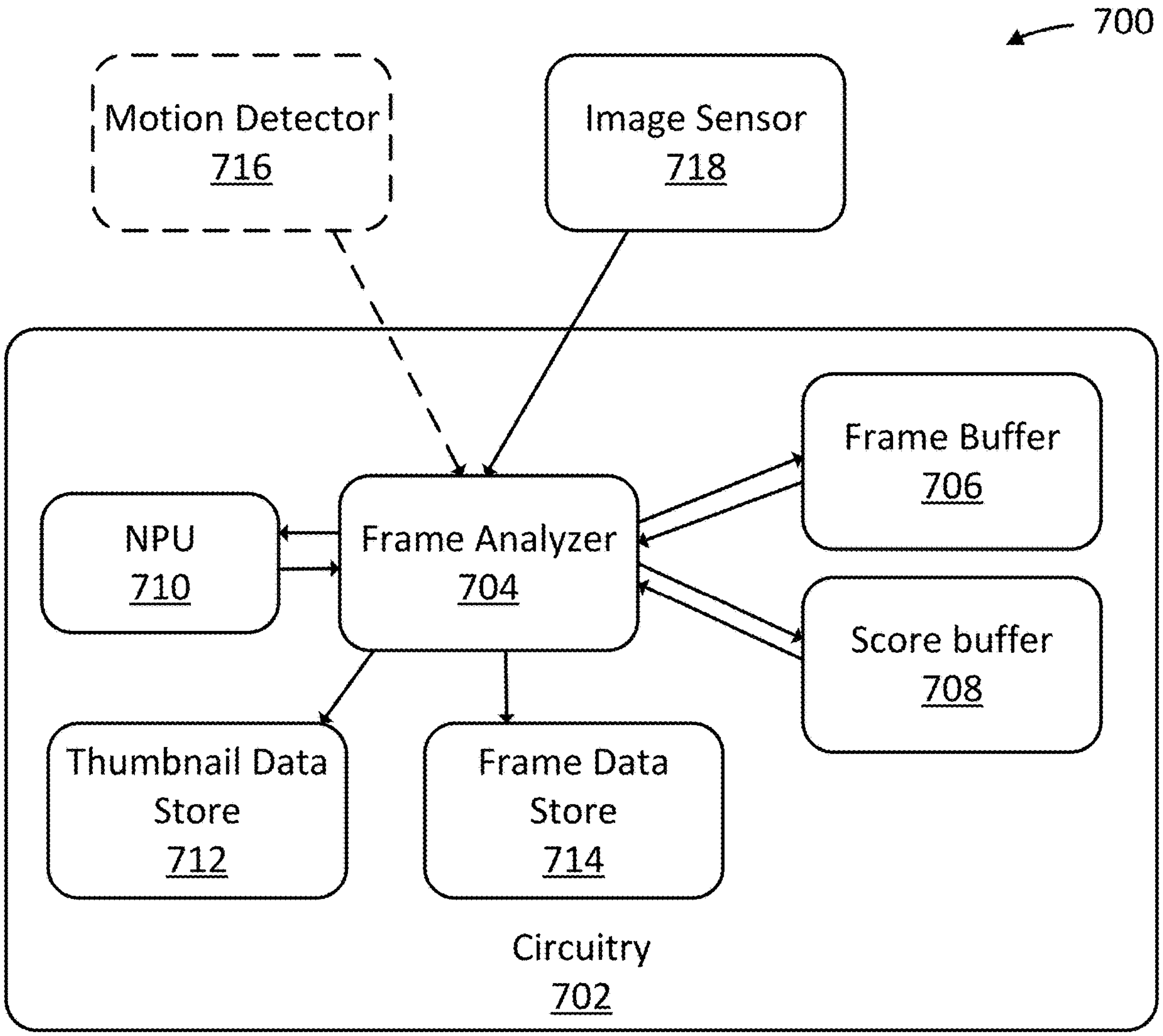
FIG. 7 is a block diagram of an image processing system, according to some examples described herein.

Turning now to FIG. 7, a configuration 700 of processes, data structures, computing hardware, and sensors that are collectively configured to score frames is schematically illustrated. The configuration 700 may be incorporated within, for example, a location-based device (e.g., the device 110 of FIG. 1). As shown in FIG. 7, the configuration 700 includes an image sensor 718 and circuitry 702. The configuration 700 may also include a motion detector 716, which is depicted in dashed lines to underscore its optionality. Each of the circuitry 702, the motion detector 716, and the image sensor 718 may be integrated into a single device or may comprise any number of separate devices. While FIG. 7 shows one of each device, the configuration 700 can support one or more of any or all of the devices. For example, several image sensors 718, some having integrated motion detectors 716, may be connected to one circuitry 702. The motion detector 716 and the image sensor 718 may be connected to (i.e., communicate with) the circuitry 702 via one or more wires, or they may be connected wirelessly. The sensor 718 and the detector 716 are coupled with the circuitry 702 to communicate analog and/or digitized signals therewith. The circuitry 702 may include one or more integrated circuits that comprise a hardware processor and memory. The memory may include volatile and/or non-volatile memory. In at least one example, the circuitry 702 is a microcontroller unit (MCU), such as a C2000 MCU commercially available from Texas Instruments of Dallas, Texas in the United States. In some examples illustrated by FIG. 7, the circuitry 702 includes a neural processing unit (NPU) 710 and is configured to implement a frame analyzer 704, which may be a program or other code stored in the memory of the circuitry 702. When operating under control of the analyzer 704, the circuitry 702 allocates and populates a frame buffer 706 and a score buffer 708; generates output specifying one or more thumbnails and/or one or more frames of interest; and stores the output in a thumbnail data store 712 and/or a frame data store 714. The buffers 706, 708 and the data stores 712, 714 may be disposed within volatile and/or non-volatile memory of the circuitry 702.

As illustrated in FIG. 7, the analyzer 704 is configured to interoperate with the sensor 718 and/or the detector 716 to identify frames of interest captured by the sensor 718. When operating according to this configuration, the analyzer 704 may utilize the buffer 706 to store a sequence of frames and compare individual frames of the sequence against one another. As a result of this comparison, the analyzer 704 may select, for example, the thumbnails or the frames of interest. In some examples, the comparison may involve each frame of the sequence, although this is not a requirement. For instance, in certain examples, the comparison may involve a discrete frame and a sequence of frames acquired sometime after the frame. Regardless, the analyzer 704 may be configured to compare frames based on one or more scores calculated by the analyzer 704. These scores may be composite scores derived from at least an appearance change score that indicates an amount of change in appearance (e.g., pixels) between frames and a semantic score that indicates semantic importance of objects depicted in frames. In certain examples, the analyzer 704 is configured to interoperate with the NPU 710 to efficiently determine a semantic score of a given frame.

Continuing with examples illustrated by FIG. 7, the configuration 700 may operate in a first mode that scores frames of a video stream in real time (i.e., continuously) as the sensor 718 captures an ongoing stream of frames depicting a scene within a field of view (FOV) of the sensor 718. In those cases, appearance change scores and semantic scores are generated for individual frames or a subset of frames of the stream. In some examples, the analyzer 704 may be configured to receive a subset of frames as a series of frames. The frame analyzer 704 may in turn divide a series into one or more sequences of frames and store one or more of the sequences of frames in the frame buffer 706. In one example, the analyzer 704 may attach an appearance change score to individual frames of the sequence based on change relative to a reference frame. The reference frame may, for instance, be a frame most recently captured before any motion in the scene is detected. In that example, frames with a higher percentage of pixel difference from the reference frame may be given corresponding higher appearance change scores compared to frames more similar to the reference frame.

The appearance change score may be further based on input from another type of sensor, such as the detector 716. The detector 716 may provide a signal (e.g., a one-dimensional signal), where variations in the signal may indicate movement or presence in proximity to the detector 716. Correlating timestamps of variations in the signal from the detector 716 with timestamps of frames captured by a sensor 718 monitoring the same scene can indicate frames more likely to be interesting because most interesting events will involve detectable movement. The analyzer 704 may be configured to reflect this higher likelihood by increasing the appearance change score attached to the frame. When the configuration 700 includes the detector 716, the analyzer 704 may be configured to select a frame having a timestamp just before a variation in the signal (corresponding to a scene just before the motion begins) as the reference frame.

Concurrently with analyzing the frames to generate appearance change scores, the analyzer 704 may control the circuitry 702 to analyze the frames via the NPU 710 to generate semantic scores. In these examples, the NPU 710 may execute a lightweight AI process, such as a process that applies a convolutional neural network (CNN) trained to identify objects of interest (e.g., humans, open doors or windows, etc.), to generate the semantic scores. The NPU 710, via the AI model, may be configured to give higher semantic scores to frames containing more interesting objects or to frames which are distinct in content from other frames of the sequence. As the semantic scores are generated by the NPU 710 and returned to the analyzer 704, the analyzer 704 may store the scores in the score buffer 708.

Continuing with examples illustrated by FIG. 7, the analyzer 704 may be configured to combine semantic scores of individual frames with corresponding appearance change scores to produce composite scores for individual frames. In these examples, the analyzer 704 is configured to identify frames with a higher composite score relative to other frames as interesting frames and to store the interesting frames in the data store 714. Further, in certain examples, the analyzer 704 is configured to select the frame of the series or sequence with the highest overall composite score to serve as a thumbnail and to store the thumbnail in the data store 712. The weights given to individual scores of a composite score may vary based on the scene observed, the make-up of the configuration 700, or the types of scores combined to create the composite score.

Continuing with examples illustrated by FIG. 7, the configuration 700 may operate in a second mode that processes recorded video data. This video data may comprise a discrete subset of a stream of frames captured by the sensor 718 or a video file (.mp4, .mov, .gifv, etc.), which may originate from the sensor 718 or from another source, such as a camera distinct from the configuration 700. In these examples, the analyzer 704 may be configured to extract a series of frames from the video data. Frames belonging to the series may be processed to generate a composite score comprising an appearance change score and a semantic score, as described above with reference to the first mode of operation. As such, the semantic scores of the frames may be generated by analyzing individual frames of the series of frames with a lightweight AI process executed by the NPU 710.

Continuing with examples illustrated by FIG. 7, when operating in the second mode, the analyzer 704 may generate a score (e.g., an appearance change score) differently for a frame of a series of frames than when operating in the first mode. For instance, in some cases, a series of frames may begin during an event (e.g., motion) to be analyzed. This starting point is different from the starting point in the first mode of operation, which may include one or more frames occurring immediately prior to the event. Therefore, under the second mode of operation, no given frame of the series can be designated as a reference frame of the scene because no frame can be assumed to depict the scene without motion to be analyzed. Instead, in the second mode, when the frames to be scored are part of a series of frames, the appearance change score may be generated by comparing individual frames with a number of prior frames in a sequence of frames to which the individual frames belong.

In some cases, the analyzer 704 may be configured to break a series of frames into one or more sequences of frames. In some examples the analyzer 704 may be further configured to store the series of frames and/or the sequences of frames in the frame buffer 706 and compare a frame N of the sequence against a number N−1 of prior frames of the sequence. For instance, the second frame of a sequence may be compared only to the first frame of the sequence, but the fifth frame may be compared individually with (e.g., with each of) the preceding four frames.

When the analyzer 704 has produced an appearance change score and a semantic score for frames of a series of frames, the analyzer may designate frames having the highest composite scores as one or more thumbnails or frames of interest. The configuration 700 may combine interesting frames into a GIF file to show an abbreviated version of the events depicted in the series of frames or may summarize the event depicted in the interesting frames via an AI process executed by the NPU 710 or elsewhere (e.g., by a surveillance service, such as the surveillance service 128 of FIG. 1).

Figure 8:
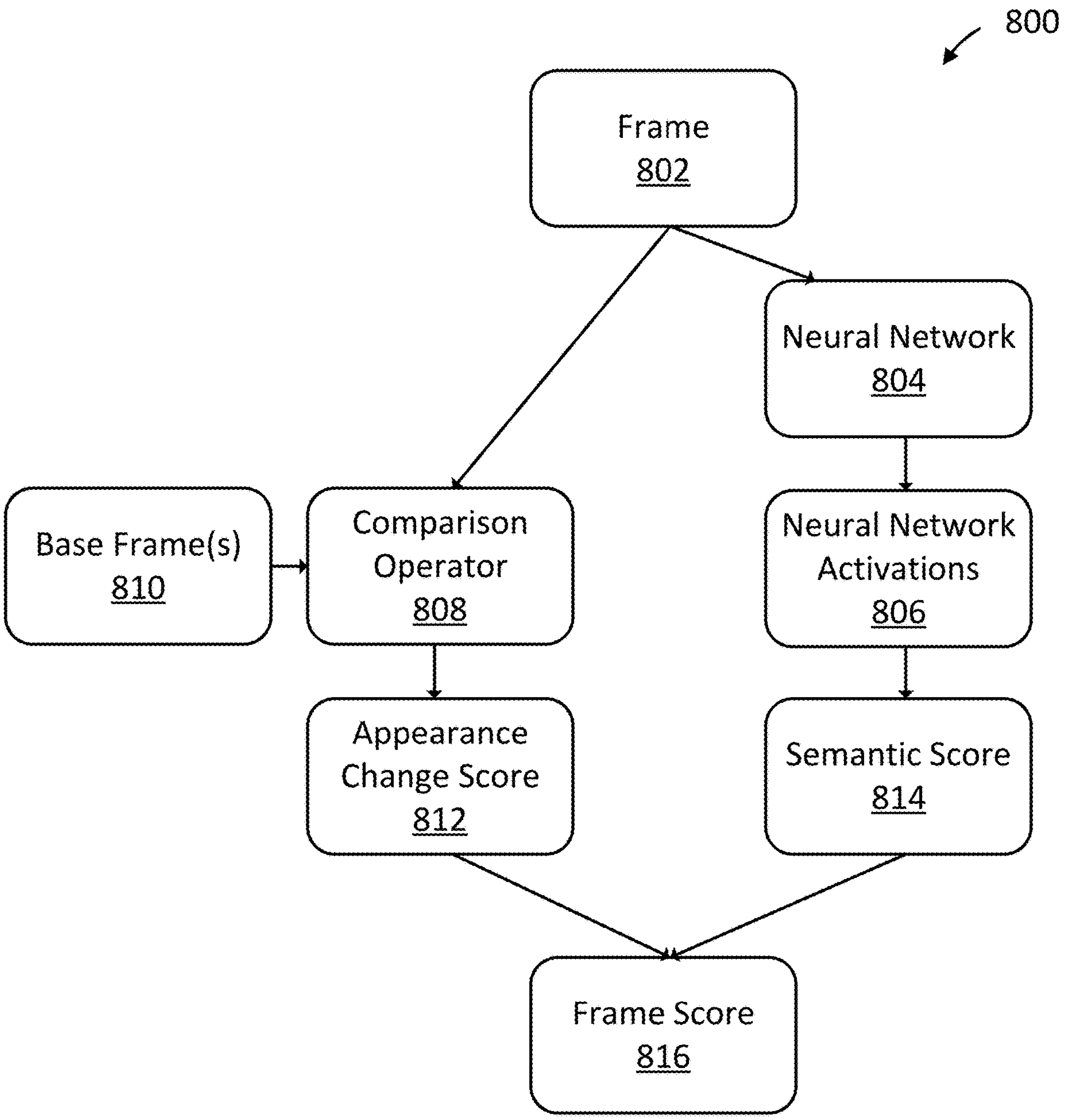
FIG. 8 is a block diagram of selected processes and data implemented and generated by an image processing system, according to some examples described herein.

FIG. 8 is a block diagram 800 that schematically illustrates selected processes implemented, and data generated, to score frames according to some examples. As shown in FIG. 8, the block diagram 800 includes a frame 802, a neural network 804, neural network activations 806, a comparison operator 808, a base frame 810, an appearance change score 812, a semantic score 814, and a frame score 816. In certain examples, the processes and data illustrated in FIG. 8 may be implemented and generated by a device including a configuration of hardware and software, such as the configuration 700 described above with reference to FIG. 7. In these examples, an analyzer, such as the analyzer 704 of FIG. 7, may control the device to execute the neural network 804 and the comparison operator 808. Further, in these examples, the analyzer may identify the frame 802 and the base frame 810, receive the scores 812, 814 from their respective processes, calculate the score 816, and store the score 816 in a data store (e.g., the data store 714 of FIG. 7) for subsequent processing.

Continuing with examples illustrated by FIG. 8, the processes and data illustrated in the block diagram 800 are involved in both the first and second modes of operation described above with reference to FIG. 7. For example, the frame 802 is received by the analyzer which, in turn, passes the frame to the operator 808 and the neural network 804 for processing. The neural network 804 responds to the frame with the activations 806, which are returned to the analyzer for computation into the score 814. In some examples, the activations 806 indicate classifications and confidences of classification accuracy that are interpreted by the analyzer to calculate the score 814. In these examples, the analyzer may be configured to assign particular classifications (e.g., classifications of the frame as depicting a human or an open door) a score that is higher than other classifications (e.g., classifications of the frame as depicting debris, leaves, etc.). In some examples, the analyzer is configured to factor the confidence indicated by the activations 806 into the score 814. For instance, the analyzer may determine the score 814 by multiplying a fixed value assigned to the classification by the confidence. Other examples of calculation methods for the score 814 will be apparent in view of this disclosure.

Continuing with examples illustrated by FIG. 8, the analyzer may be configured to initiate the operator 808 and pass the frame 802 to the operator 808 to generate the score 812. As shown in FIG. 8, the operator 808 may access one or more base frames 810 while generating the score 812. Processes that operator 808 is configured to execute to generate the score 812 may vary substantially between examples of the analyzer. Some specific examples of such processes are described further below with reference to FIGS. 9, 10, 12, and 13. Moreover, the processes that the operator 808 is configured to execute between the first mode and the second mode, even within particular examples of the analyzer. For instance, in some examples of the analyzer, the one or more frames 810 include a single reference frame when the analyzer is operating in the first mode. In these same examples of the analyzer, the one or more frames 810 may include a plurality of frames that varies with an ordinal position, within a sequence of frames, of the frame 802, when the analyzer is operating in the second mode.

Figure 9:
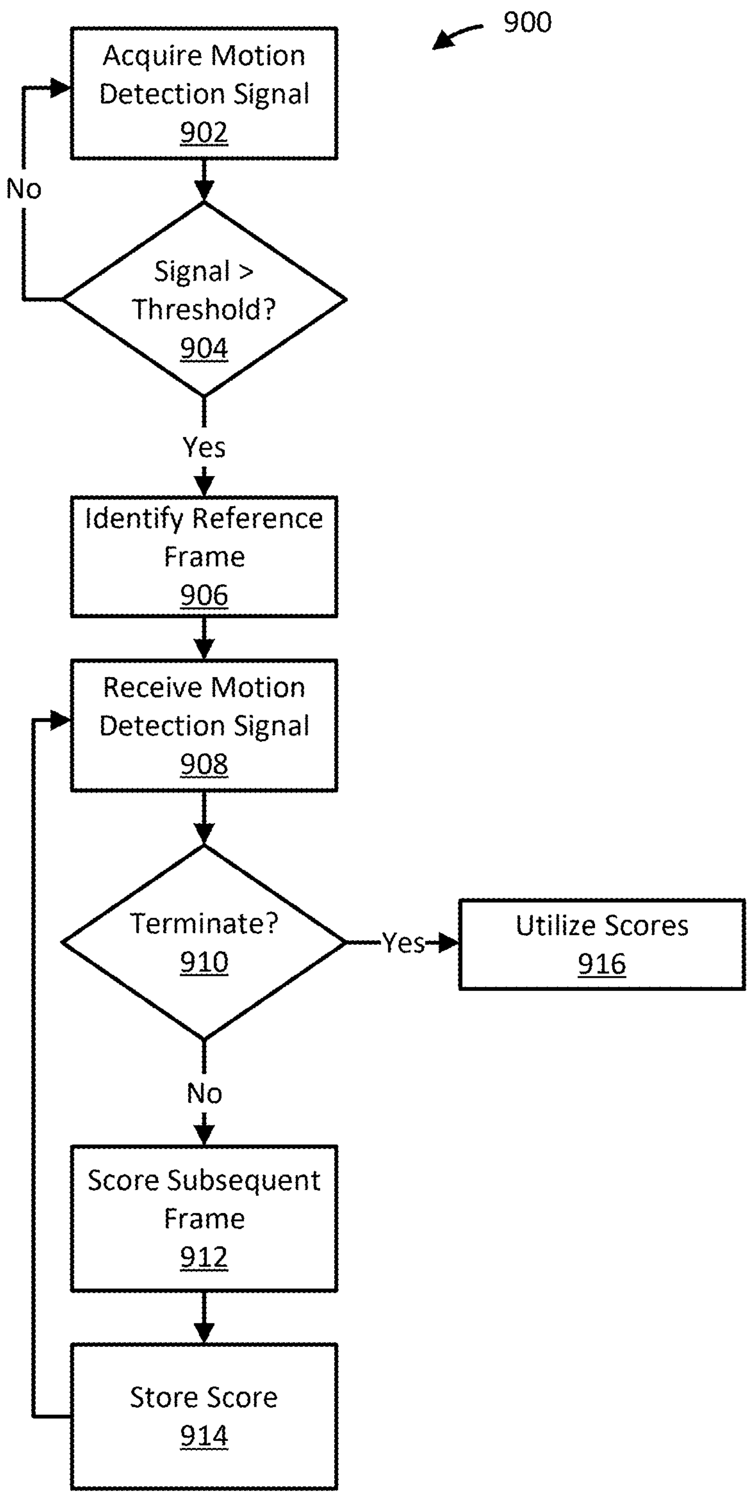
FIG. 9 is a flow diagram of an image analysis process, according to some examples described herein.

Turning now to FIG. 9, a process 900 of scoring frames in real time is illustrated as a flow diagram. The process 900 may be executed by a device including a configuration of hardware and software, such as the configuration 700 of FIG. 7, when operating in a first mode. Some or all of the process 900 may additionally or alternatively be executed by a remote computing device, such as the data center environment 124 of FIG. 1 and/or be implemented in special-purpose hardware (e.g., a field programmable gate array, an application specific integrated circuit, or some other special-purpose computing hardware). In some examples, the device receives a stream of frames from an image sensor (e.g., the sensor 718 of FIG. 7) and stores frames from the stream in a first data store (e.g., the buffer 706 of FIG. 7) during execution of the process 900. Further, in certain examples, the device acquires at least one frame prior to execution of the process 900, as will be described further below. As shown in FIG. 9, the process 900 starts with the device acquiring 902 a signal indicative of motion, as may be acquired by a motion detector (e.g., the detector 716 of FIG. 7). For instance, in one example, the signal may be generated by infrared energy emitted by a person passing through a FOV of the motion detector, and the motion detector may transmit the generated signal to circuitry (e.g., the circuitry 702 of FIG. 7) with which the motion detector is coupled. The circuitry, in turn, may pass the signal to an analyzer (e.g., the analyzer 704 of FIG. 7), and the analyzer may receive the signal.

Continuing with examples illustrated by FIG. 9, the analyzer determines 904 whether an attribute of the signal received in the operation 902 transgresses a threshold. For instance, in some examples, the analyzer compares an amplitude of the signal (e.g., a voltage) to a threshold value and determines that the attribute of the signal has transgressed the threshold if the amplitude is greater than the threshold value. If the analyzer determines 904 that the attribute of the signal transgresses the threshold, the analyzer proceeds to operation 906. If the analyzer determines 904 that the attribute of the signal does not transgress the threshold, the analyzer returns to the operation 902.

Continuing with examples illustrated by FIG. 9, an analyzer identifies 906 a reference frame (e.g., the frame 810 of FIG. 8) for subsequent processing. For instance, in some examples, the analyzer identifies and preserves (e.g., stores in memory at a recorded location) a frame received from the image sensor prior to a point in time linked to or otherwise associated with the transgression of the threshold by the signal, as determined in the operation 904. This reference frame may depict a scene without motion within the FOV of the image sensor.

Continuing with examples illustrated by FIG. 9, the analyzer continues to receive 908 signals indicative of motion. For instance, in some examples, the signal continues to be generated by infrared energy emitted by a person within the FOV of the motion detector, and the motion detector continues to acquire the signal and pass the signal to the circuitry. The circuitry, in turn, passes the signal to the analyzer, and the analyzer continues to receive the signal.

Continuing with examples illustrated by FIG. 9, an analyzer determines 910 whether one or more termination conditions has occurred, as described below with regard to each termination condition. According to various examples, termination conditions may include one or more of the following conditions.

- An attribute of the signal received in the operation 908 transgresses a threshold. The attribute and the threshold may be, for example, the attribute and the threshold value described above with reference to the operation 904 or may be another attribute and threshold value.
- An amount of time since the point in time linked to or otherwise associated with the transgression of the attribute of the threshold by the signal, as determined in the operation 904, has transpired.
- An alarm condition linked to or otherwise associated with the device is dismissed.

In some examples, if the analyzer determines that one or more of the termination conditions has occurred, the analyzer proceeds to the operation 916. If the analyzer determines that no termination condition has occurred, the analyzer proceeds to operation 912.

Continuing with examples illustrated by FIG. 9, an analyzer scores 912 a subsequent frame (e.g., the frame 802) received from the image sensor. For instance, in some examples, the analyzer retrieves the subsequent frame from the first data store, initiates a comparison operator (e.g., the operator 808 of FIG. 8), and passes the subsequent frame to the comparison operator for processing.

In some examples, the comparison operator receives the subsequent frame and controls the circuitry to process image data stored within the subsequent frame. For instance, in some examples, the comparison operator compares the reference frame to the subsequent frame to calculate a metric (e.g., mean squared error, peak signal-to-noise ratio, sum of absolute differences, Hamming distance, etc.) that indicates an amount of change (e.g., quantifies motion) between the frames. The comparison operator may pass the metric to the analyzer. The analyzer may generate an appearance change score based on the metric. For instance, the analyzer may record the metric as the appearance change score or may normalize or otherwise convert the metric to the appearance change score via one or more additional calculations. In certain examples, the amount of change between the frames reflected in the metric is directly related to the change appearance score.

Figure 10:
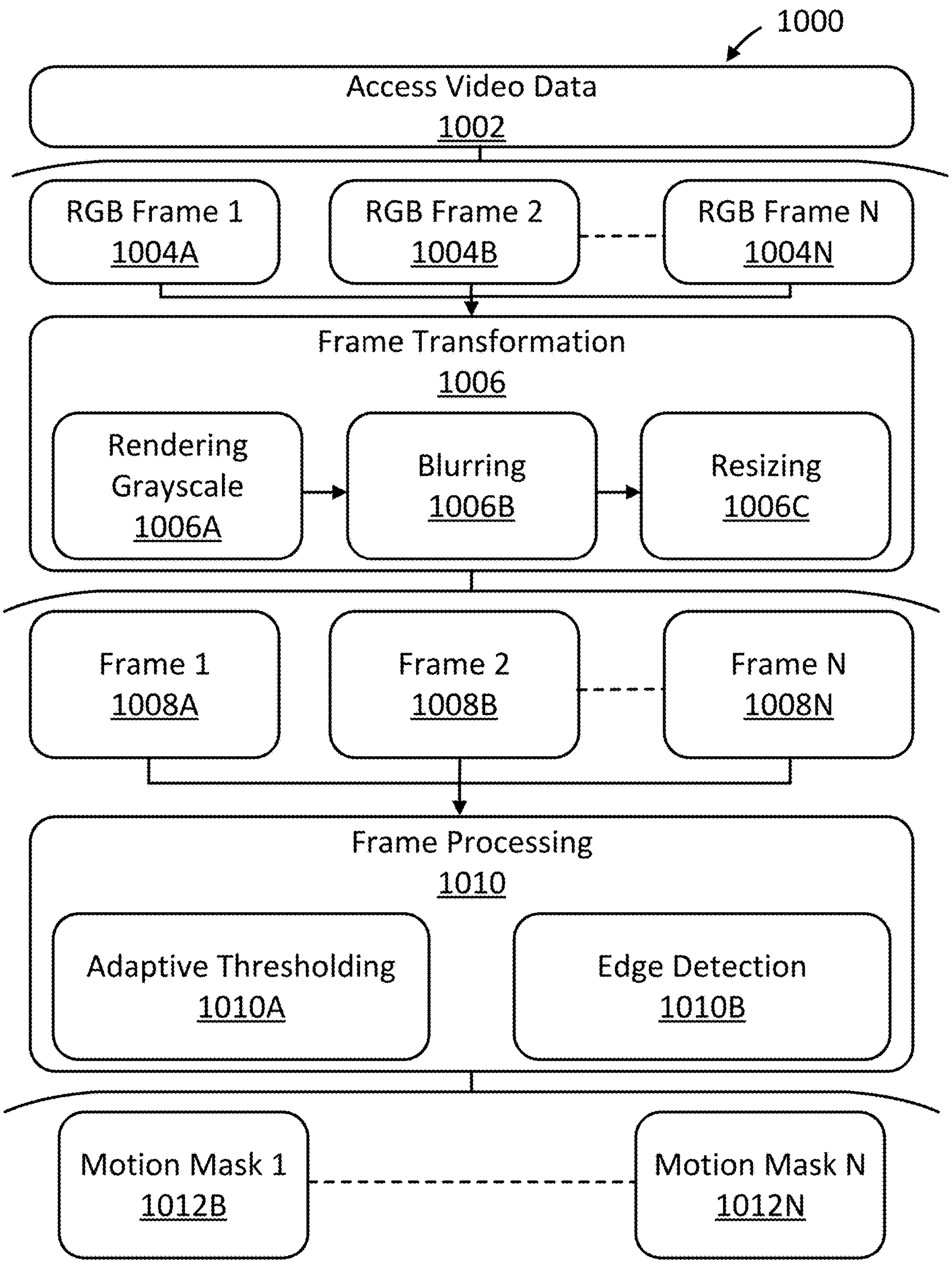
FIG. 10 is a flow diagram of a process of generating motion masks, according to some examples described herein.

In certain examples, the processing executed by the comparison operator within the operation 912 may be more complex. For instance, in some examples, the comparison operator determines a motion mask that pinpoints locations of motion in the subsequent image and calculates the amount of change between frames using the motion mask. FIG. 10 illustrates a process 1000 of creating one or more motion masks as a flow diagram. In some examples, the comparison operator controls the circuitry to execute the process 1000 within the operation 912.

As shown in FIG. 10, the process 1000 starts with accessing 1002 a series of frames (e.g., as may be included in the video data 1702 of FIG. 17) including one or more frames 1004A-1004N stored in red-green-blue format. This series of frames may include, for example, the subsequent frame referenced in the operation 912, which may be accessed from the first data store described above with reference to the process 900. When the process 1000 is executed within the operation 912, the frame 1004A (and the frame 1008A described below) may correspond to the reference frame referenced in the operation 912, and the frame 1004B (and the frame 1008B and the motion mask 1012B described below) may correspond to the subsequent frame referenced in the operation 912.

Continuing with examples illustrated by FIG. 10, the comparison operator transforms 1006 the frames. As shown in FIG. 10, this transformation may include rendering 1006A in grayscale image data included in the frames. Grayscale rendering simplifies subsequent processing and enhances contrast, making it easier to detect movement. Any technique of rendering an image to greyscale may be used, including converting RGB to greyscale, or converting RGB to HSV and, for example, discarding hue and saturation channels. The transformation executed in the operation 1006 may further include blurring 1006B the frames. For instance, in some examples, the comparison operator applies Gaussian blurring to the grayscale image data to reduce noise and remove abrupt changes to enable robustness. The transformation executed in the operation 1006 may further include resizing (e.g., up sampling or down sampling) blurred and grayscale image data. Resizing (e.g., down sampling) the image data may decrease resources required for subsequent processing of the image data. In a particular example, the image data may be resized to maintain the aspect ratio of the image data while reducing at least one dimension of the image data to 256 pixels. Resizing to 256 pixels allows the image data to retain sufficient information for motion detection purposes while minimizing resources required for subsequent processing. After transforming 1006 the frames, the comparison operator may store the frames 1008A-1008N in the first data store for subsequent processing.

Continuing with examples illustrated by FIG. 10, the comparison operator processes 1010 the frames. As shown in FIG. 10, this processing may include generating motion masks 1012B-1012N. The masks 1012B-1012N are virtual constructs that can be applied to the frames 1008A-1008N to identify and isolate regions that depict moving objects within them, thereby directing subsequent processing to regions depicting motion while avoiding static regions. In general, when the process 1000 is executed within the operation 912, the comparison operator generates a motion mask 1012B by analyzing the reference frame and the subsequent frame and marking pixels that change between the frames. More specifically, in some examples, the comparison operator generates the mask 1012B using adaptive thresholding 1010A and/or edge detection 1010B. Both edge detection and adaptive thresholding (see, e.g., U.S. Pat. No. 12,169,940 B2, which is hereby incorporated herein by reference in its entirety) are techniques for identifying regions of motion within image data. As such, neither technique will be described further. After identifying regions of motion within the subsequent frame, the comparison operator records the regions of motion within the mask 1012B for subsequent processing, and the process 1000 ends.

Returning to the process 900, in some examples of the operation 912, the comparison operator overlays or otherwise applies the motion mask upon the reference frame and the subsequent frame to compare the regions of motion identified by the motion mask. This comparison may include calculation of a metric (e.g., mean squared error, peak signal-to-noise ratio, sum of absolute differences, Hamming distance, etc.) that indicates an amount of change (e.g., quantifies motion) between the regions. The comparison operator may pass the metric to the analyzer. The analyzer may generate an appearance change score based on the metric. For instance, the analyzer may record the metric as the appearance change score or may normalize or otherwise convert the metric to the appearance change score via one or more additional calculations. In certain examples, the amount of change between the frames reflected in the metric is directly related to the change appearance score.

Alternatively or additionally, in some examples of the operation 912, the analyzer initiates an ANN (e.g., the neural network 804 of FIG. 8) via an NPU (e.g., the NPU 710 of FIG. 7) and passes the subsequent frame to the ANN for processing. In these examples, the NPU, under control of the analyzer, receives the subsequent frame and applies the ANN to data (e.g., image data) stored within the subsequent frame. In these examples, the ANN is trained to classify the data into one or more categories with an associated confidence. Examples of categories into which the ANN may be trained to classify data include humans, human faces, closed doors, open doors, closed windows, open windows, humans in a door, humans in a window, etc. The confidence with which the ANN is able to classify the data may be presented as a value between 0 and 1 and may represent the probability that the ANN successfully classified the image data. Further, in these examples, the analyzer may generate a score (e.g., a semantic score) for the image data by multiplying a numeric value associated with the category of the data by the confidence of the ANN's classification of the data. It should be noted that, in certain examples, the analyzer overlays or otherwise applies the motion mask described above upon the subsequent frame to filter application of the ANN by the NPU to regions of data that depict motion. This approach may increase the efficiency and/or efficacy of the ANN in classifying the data, as described above.

Continuing with the operation 912, the analyzer combines the appearance change score, the semantic score, and an attribute of the signal received in the operation 908 to determine a composite score for the subsequent frame. The attribute of the signal utilized in the operation 912 may be, for example, an amplitude of the signal. In at least one example, the analyzer sums the appearance change score, the semantic score, and the attribute to determine the composite score. In other examples, the analyzer applies discrete weights to the appearance change score, the semantic score, and/or the attribute prior to calculating a sum of the addends. A wide variety of composite score calculations will be apparent in view of this disclosure.

Continuing with examples illustrated by FIG. 9, an analyzer stores 914 the composite score for the subsequent frame in a second data store for subsequent processing and returns to the operation 908. For instance, in some examples, the analyzer stores the score generated by the operation 912 with a link or other association to the subsequent frame. The second data store used by the analyzer may be, for example, the buffer 708 of FIG. 7.

Continuing with examples illustrated by FIG. 9, a security system to which the device belongs utilizes 916 the scores calculated in the operation 914 to execute one or more procedures. For instance, in some examples, the device selects thumbnails and/or frames of interest based on the scores and transmits the thumbnails and/or frames of interest to a surveillance service, such as the service 128 of FIG. 1. In these examples, the surveillance service, in turn, executes the procedures. The procedures may include identifying one or more additional thumbnail images, creating of a video including exclusively the frames of interest, and/or creating descriptions of individual frames or the video overall by a generative AI image-to-text process, to name a few procedures. In some examples, the security system is configured to render the thumbnail images, videos, and descriptions described above to a user, such as a monitoring professional or a customer, via an agency interface (e.g., the interface 130A of FIG. 5) or a customer interface (e.g., the interface 132A of FIG. 5).

Figure 11:
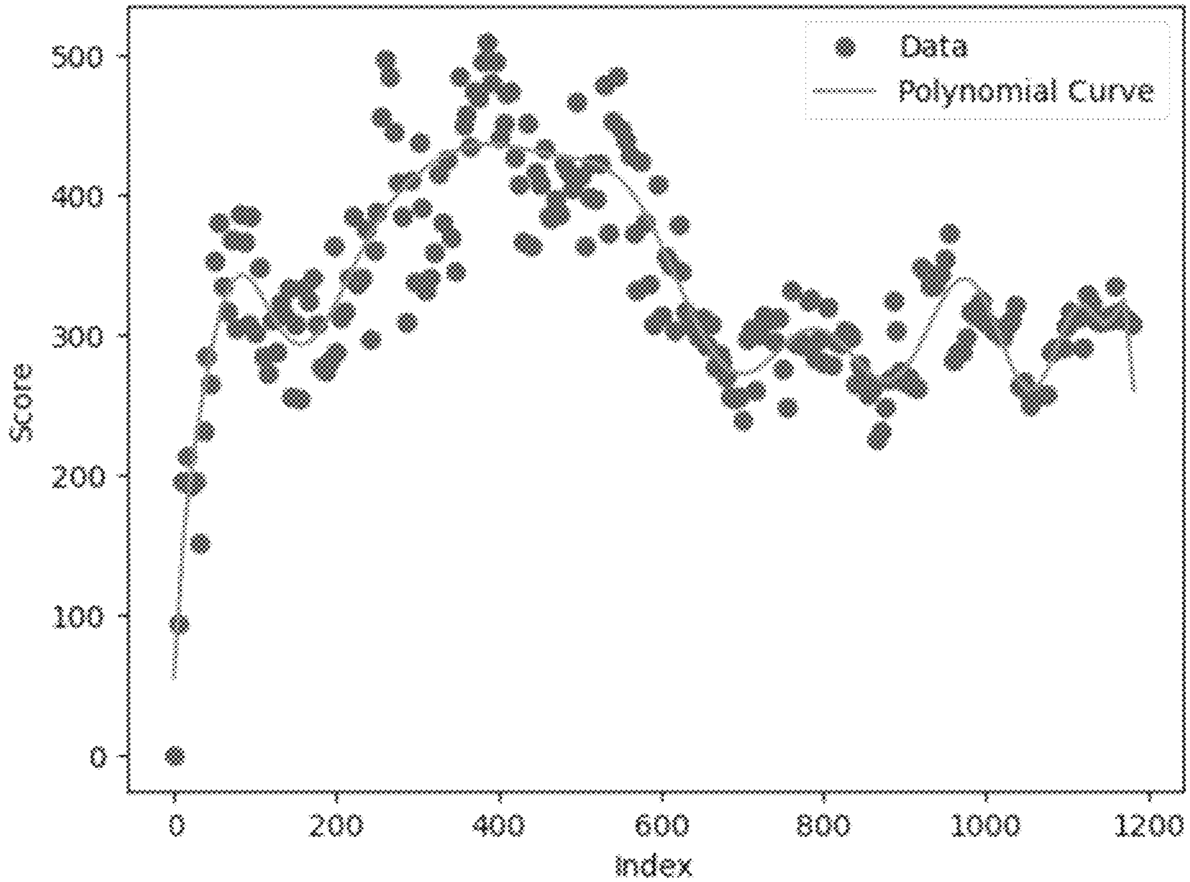
FIG. 11 is a graph depicting scores of a sequence of frames, according to some examples described herein.

In some examples, prior to executing the one or more procedures, the system (e.g., a security system) may generate a graph of the composite scores and utilize the graph to select frames of interest. Turning now to FIG. 11, one example of a graph of composite scores of a reference frame and a stream of subsequent frames is illustrated. As shown in FIG. 11, the x-axis represents an index value of a frame, and the y-axis represents a composite score (as determined above by the process 900). The composite score values may increase or decrease based on the content of each frame. As shown by the graph, the reference frame (which may be compared to itself to establish a baseline score) has a composite score of 0. The remaining subsequent frames have scores ranging from 100 to 500 or more. Further illustrated in FIG. 11 is a polynomial curve fitted to the composite score values. Attributes, such as slope, local maxima, and local minima may be used to identify frames of interest for subsequent procedures, as described above. For instance, in some examples, frames temporally proximal to (within 1 second, 2 seconds, etc.—before or after) local maxima and minima may be selected as frames of interest.

Figure 12:
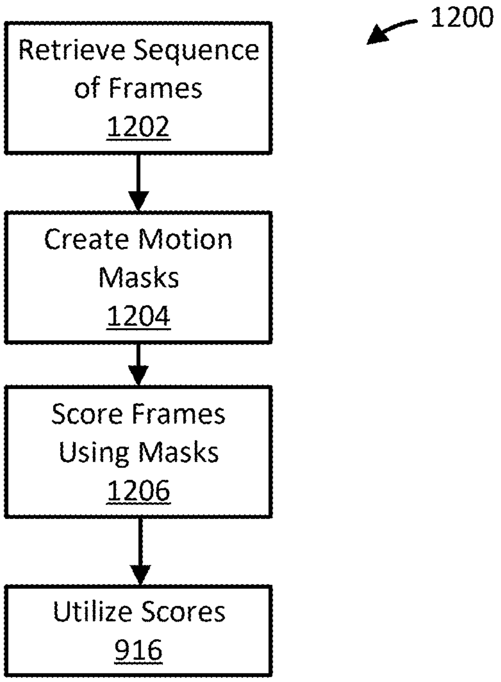
FIG. 12 is a flow diagram of another image analysis process, according to some examples described herein.

Turning now to FIG. 12, a process 1200 of scoring frames from a recorded video is illustrated as a flow diagram. The process 1200 may be executed by a device including a configuration of hardware and software, such as the configuration 700 of FIG. 7, when operating in a second mode. In some examples, the device acquires a video comprising a series of frames from an image sensor (e.g., the sensor 718 of FIG. 7) and stores the series of frames from the video in a first data store (e.g., the buffer 706 of FIG. 7) prior to execution of the process 1200. As shown in FIG. 12, the process 1200 starts with an analyzer (e.g., the analyzer 704 of FIG. 7) retrieving 1202 the series of frames stored in the first data store for subsequent processing.

Continuing with examples illustrated by FIG. 12, the analyzer creates 1204 motion masks for the series of frames. For instance, in some examples, the analyzer initiates a comparison operator (e.g., the operator 808 of FIG. 8) and passes the series of frames to the comparison operator for processing. In these examples, the comparison operator determines motion masks for frames within the series of frames according to the process described above with reference to FIG. 10. In some examples, the comparison operator controls the circuitry to execute the process 1000 within the operation 1204.

As shown in FIG. 10, the process 1000 starts with the comparison operator accessing 1002 the series of frames retrieved in the operation 1202 of FIG. 12. As shown in FIG. 10, the series of frames includes frames 1004A-1004N, which are stored in red-green-blue format. Next, the comparison operator transforms 1006 the frames. As shown in FIG. 10, this transformation may include rendering 1006A in grayscale image data included in the frames. Grayscale rendering simplifies subsequent processing and enhances contrast, making it easier to detect movement. The transformation executed in the operation 1006 may further include blurring 1006B the frames. For instance, in some examples, the comparison operator applies Gaussian blurring to the grayscale image data to reduce noise and remove abrupt changes to enable robustness. The transformation executed in the operation 1006 may further include resizing (e.g., up sampling or down sampling) blurred and grayscale image data. Resizing (e.g., down sampling) the image data may decrease resources required for subsequent processing of the image data. In a particular example, the image data may be resized to maintain the aspect ratio of the image data while reducing at least one dimension of the image data to 256 pixels. Resizing to 256 pixels allows the image data to retain sufficient information for motion detection purposes while minimizing resources required for subsequent processing. In other examples, image data may be resized to other dimensions. After transforming 1006 the frames, the comparison operator may store the frames 1008A-1008N in the first data store for subsequent processing.

Continuing with examples illustrated by FIG. 10, the comparison operator processes 1010 the frames. As shown in FIG. 10, this processing may include generating motion masks 1012B-1012N. The masks 1012B-1012N identify and isolate regions that depict moving objects within the frames 1008A-1008N, thereby directing subsequent processing to regions depicting motion while avoiding static regions. In general, when the process 1000 is executed within the operation 1204, the comparison operator generates the masks 1012B-1012N by analyzing pairs of consecutive frames (e.g., each consecutive pair) within the series and marking pixels that change between the frames. More specifically, in some examples, the comparison operator generates the masks 1012B-1012N using adaptive thresholding 1010A and/or edge detection 1010B. After identifying regions of motion within the frames, the comparison operator records the regions of motion within the masks 1012B-1012N for subsequent processing, and the process 1000 ends.

Figure 13:
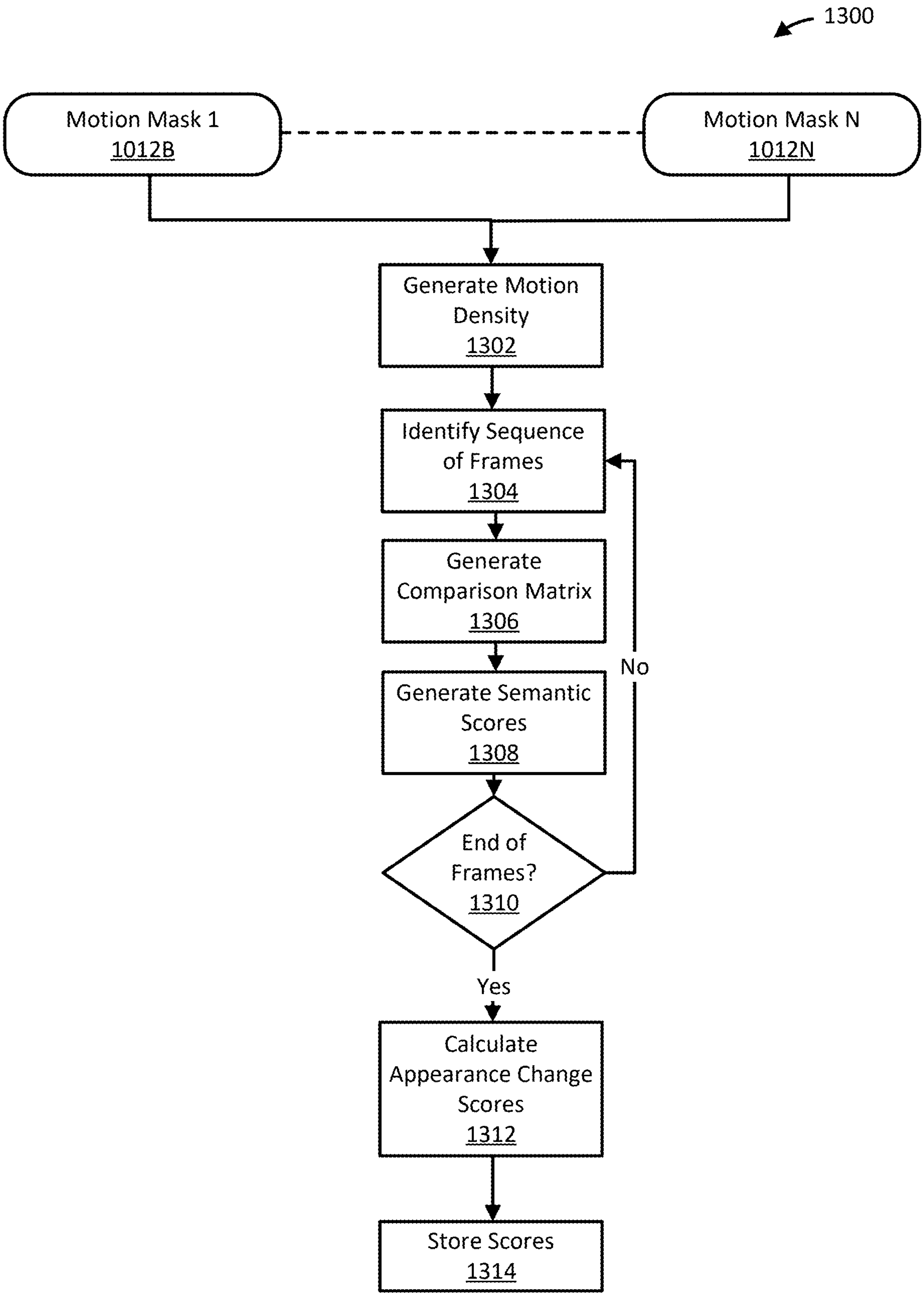
FIG. 13 is a flow diagram of operations executable by an image processing system, according to some examples described herein.

Returning to the process 1200, the analyzer scores 1206 the frames of the series. FIG. 13 illustrates, as a flow diagram, a process 1300 of scoring frames using one or more motion masks. As shown in FIG. 13, the process 1300 starts with the comparison operator generating 1302 motion densities for the frames using the masks 1012B-1012N. For instance, in some examples where the masks 1012B-1012N were determined using adaptive thresholding, the comparison operator calculates motion density (MD) using Equation 1.

$$MD = \frac{\sum_{0}^{N} I(m, n) \geq T}{H \times W} \quad \text{Equation 1}$$

In Equation 1, I(m,n) is a set of image data with height H and width W. Further, in Equation 1, T is a threshold generated by adaptive thresholding that is used to segment the image data into foreground (e.g. motion) and background (e.g., static) regions. Alternatively or additionally, in some examples where masks 1012B-1012N were determined using edge detection, the comparison operator similarly normalizes image data segmented into foreground and background regions using the dimensions of the image data.

Continuing with examples illustrated by FIG. 13, the comparison operator next enters a loop in which the comparison operator iteratively identifies 1304 a sequence of frames (e.g., the sequence 1704 of FIG. 17) from the series of frames stored in the first data store and generates 1306 a comparison matrix based on the sequence. The sequence of frames may be a subset of the series of frames processed by the operation 1204 of FIG. 12 and operation 1302 above. In some examples, by executing the loop to completion, the comparison operator generates a comparison matrix for the entire series of frames. By comparing frames within smaller, identified sequences of neighboring frames from a larger series of frames, rather than by comparing frames to other frames within the entire series, the examples disclosed herein maintain coherence and consistency throughout the comparison matrix. The smaller sequences act as a temporal window that passes over the larger series and through which the comparison operator calculates values of the comparison matrix. The comparison matrix calculations benefit from smooth transitions and continuity of image data between adjacent and/or neighboring frames, which enables the comparison operator to handle large variations in motion density from non-neighboring frames more effectively. This approach ensures robust frame-by-frame processing, which is helpful for downstream tasks, such as motion analysis, object tracking, and/or video summarization.

More specially, in some examples, the comparison operator identifies 1304 a sequence of frames having a default cardinality (e.g., 20 frames) from the first data store. Alternatively or additionally, in some examples, the comparison operator identifies 1304 a sequence of frames based on motion density values linked to or otherwise associated with the frames. This motion density based approach to identification 1304 allows some examples of the comparison operator to process larger sequences of frames if the motion density of the individual frames within the sequence is relatively small, which can increase overall comparison efficiency. Furthermore, the motion density based approach allows the comparison operator to process smaller sequences of frames if the motion density of the individual frames is relatively large, which preserves the comparison operator's ability to handle large variations in motion density over a short sequence of frames. In some examples directed to the motion density based approach, the comparison operator refers to a configurable parameter that specifies a minimize sequence cardinality regardless of the motion density of the individual frames (e.g., 5 frames), to ensure a base level of comparison efficiency.

Continuing with examples illustrated by FIG. 13, the comparison operator generates 1306 a comparison matrix for the sequence identified in the operation 1304. For instance, in some examples, the comparison operator calculates a two-dimensional matrix C(N×N), where C is the comparison matrix and N denotes the number of frames in the sequence. The comparison matrix, and the scores therein, characterize the motion between frames quantitatively. In certain examples, the comparison operator computes, and records within the matrix C, motion density values between a current frame and all previous frames in the sequence according to Statement 1.

Statement 1

$$C = MD(\text{Frame}_i, \text{Frame}_j), \text{ if } 0 \leq j < i \text{ and } j \geq \left(0, i - \text{sequence}_{size(i)}\right);$$
$$0, \text{ otherwise}$$

It should be noted that the motion density calculation described above in operation 1302 is determined between a current frame and a previous frame (e.g., consecutive frames) only. In contrast, the motion density according to Statement 1 is determined between a current frame and all previous frames in the sequence.

Figure 14:
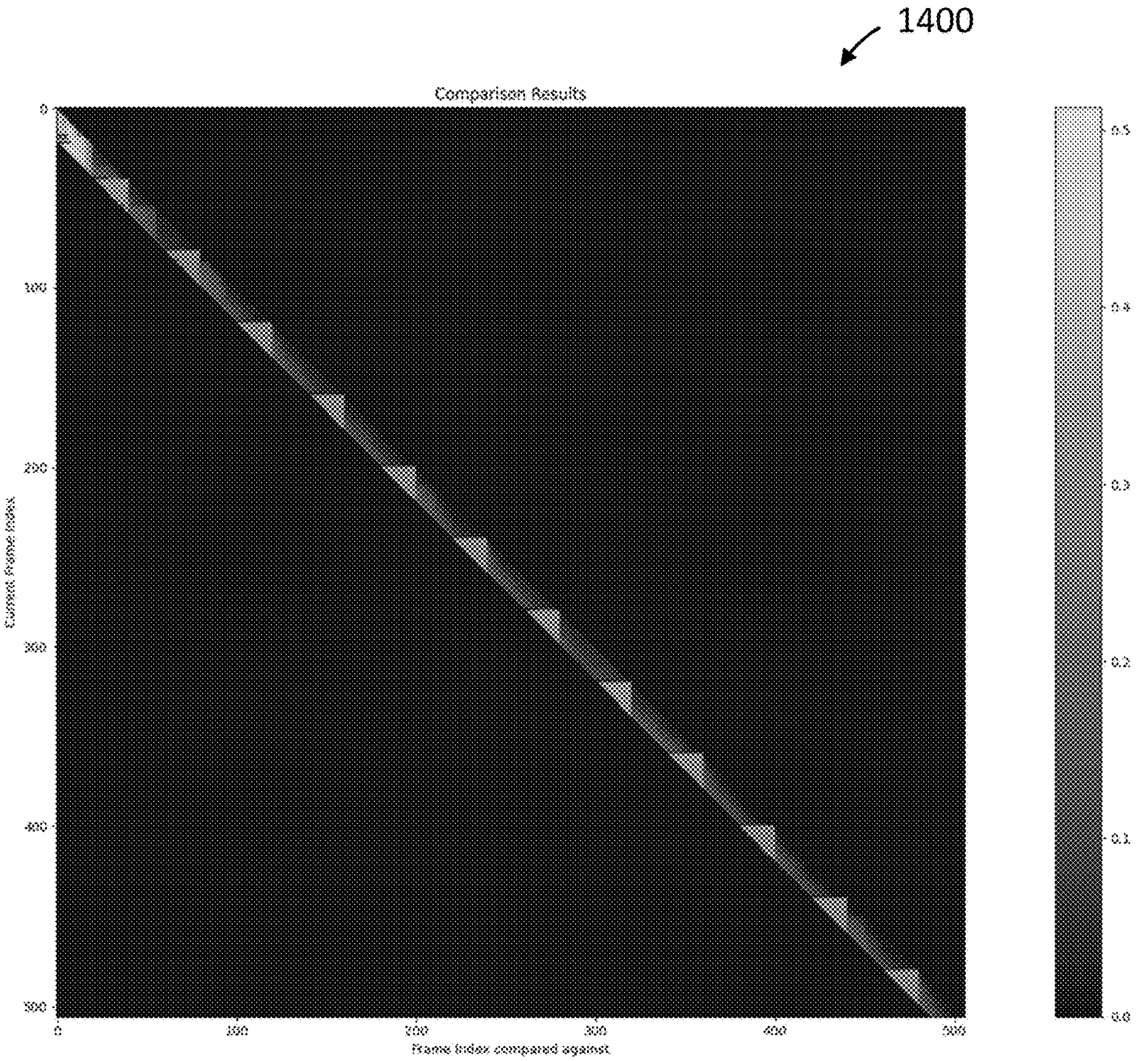
FIG. 14 is a graph showing scores resulting from comparisons of a frame to other frames within sequences of frames selected from a video, according to some examples described herein.

Continuing with the operation 1306, after completing calculation of the matrix C, the comparison operator places the matrix C into an overall two-dimensional scoring matrix S(M×M), where S is the scoring matrix and M denotes the number of frames in the series stored in the first data store. In this way, upon completion of a final iteration of the loop, the scoring matrix S will contain comparison values involving all frames in the series. The scoring matrix S contributes to capturing individual frames' temporal relationships and motion dynamics. Elements within the scoring matrix S represent a computed score between frames (e.g., a current frame and a previous set of frames within a sequence), that reflects a spatial and temporal proximity constrained by sequence cardinality. One example of a graph 1400 of a complete scoring matrix S is illustrated in FIG. 14. As shown in FIG. 14, the x-axis represents an index of frames compared against and the y-axis represents a current frame index. As illustrated in graph 1400, comparison values ranging between 0 and approximately 0.52 are recorded between a single, current frame on the y-axis and multiple, previous frames on the x-axis. In generating the graph, sequence cardinality defaulted to 20, but some variation is evident sporadically (e.g., for some current frame values between approximately 15 and 20, 35, etc.). As also shown in the graph 1400, heavy movement occurred near the beginning of the series and then periodically throughout the series.

Continuing with examples illustrated by FIG. 13, the analyzer generates 1308, alternatively or additionally to the operation 1306, a semantic score for the sequence identified in the operation 1304. For instance, in some examples, the analyzer initiates an ANN (e.g., the neural network 804 of FIG. 8) via an NPU (e.g., the NPU 710 of FIG. 7) and passes the sequence of frames to the ANN for processing. In these examples, the NPU, under control of the analyzer, receives the sequence of frames and applies the ANN to image data stored within the sequence of frames. In these examples, the ANN is trained to classify the image data into one or more categories with an associated confidence. Examples of categories into which the ANN may be trained to classify image data include humans, human faces, closed doors, open doors, closed windows, open windows, humans in a door, humans in a window, etc. The confidence with which the ANN is able to classify the image data may be presented as a value between 0 and 1 and may represent the probability that the ANN successfully classified the image data. Further, in these examples, the analyzer may generate the semantic score for the sequence of frames by multiplying a numeric value associated with the category of the image data by the confidence of the ANN's classification of the sequence of frames. It should be noted that, in certain examples, the analyzer overlays or otherwise applies the motion mask described above upon the frames within the sequence of frames to filter application of the ANN by the NPU to regions of image data that depict motion. This approach may increase the efficiency and/or efficacy of the ANN in classifying the image data, as described above.

Continuing with examples illustrated by FIG. 13, the comparison operator determines 1310 whether frames within the series of frames remain unprocessed by the current instance of the process 1300. For instance, in some examples, the comparison operator compares an index of a last frame within the current sequence to an index of a last frame in the series. If the index of the last frame within the current sequence is less than the index of the last frame in the series, the comparison operator returns to the operation 1304 to identify another sequence of frames within the series for processing. If the index of the last frame within the current sequence is equal to the index of the last frame in the series, the comparison operator proceeds to operation 1312.

Continuing with examples illustrated by FIG. 13, the comparison operator calculates 1312 scores for the frames in the series of frames. For instance, in some examples, the comparison operator sums rows of the scoring matrix S to generate a one-dimensional matrix of score values. These values reflect the cumulative motion density of individual frames with reference to preceding (e.g., all preceding) frames within a sequence. This approach progressively integrates motion scores across temporal boundaries, effectively capturing relative contributions of individual frames to motion dynamics present in the series of frames. The scores in the one-dimensional matrix reflect historical context of individual frames, allowing the device to identify gradual changes or trends in motion density. Moreover, in some examples, the scores in the one-dimensional matrix are appearance change scores, as described above.

Continuing with the operation 1312, the analyzer combines the appearance change scores and optionally the semantic scores, if the semantic scores are available, to determine a composite score for individual frames within the series of frames. In at least one example, to determine the composite score, the analyzer sums the appearance change score for individual frames with the semantic score applicable to the sequence of frames to which the individual frames belong. In other examples, the analyzer applies discrete weights to the appearance change score and/or the semantic score prior to calculating a sum of the addends. A wide variety of composite score calculations will be apparent in view of this disclosure.

Continuing with examples illustrated by FIG. 13, an analyzer stores 1314 the composite scores for the series of frames in a second data store for subsequent processing. For instance, in some examples, the analyzer stores the scores generated by the operation 1312 with a link or other association to the frames. The second data store used by the analyzer may be, for example, the buffer 708 of FIG. 7.

Figure 17:
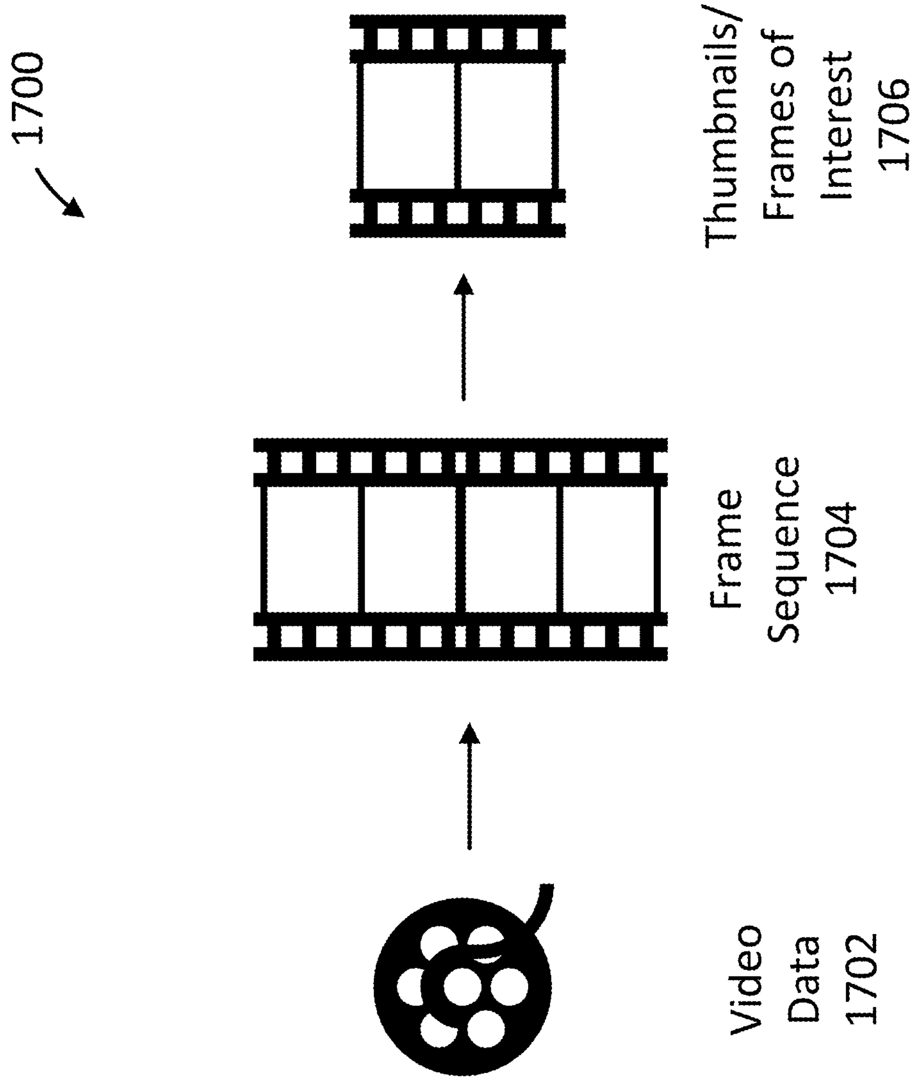
FIG. 17 is a schematic diagram illustrating video data being decomposed into a sequence of frames and the sequence of frames being decomposed into thumbnails and/or frames of interest.

Returning to examples illustrated by FIG. 12, the security system including the device utilizes 916 the scores generated by the operation 1206 (e.g. to identify one or more thumbnails for frames of interest, such as the thumbnails/frames of interest 1706 of FIG. 17). Details regarding the security system's utilization 916 of the scores are described above with reference to FIG. 9 and will not be repeated, although when the operation 916 is executed as part of the process 1200, the operation 916 may calculate a graph such as the graph 1500 of FIG. 15.

Figure 15:
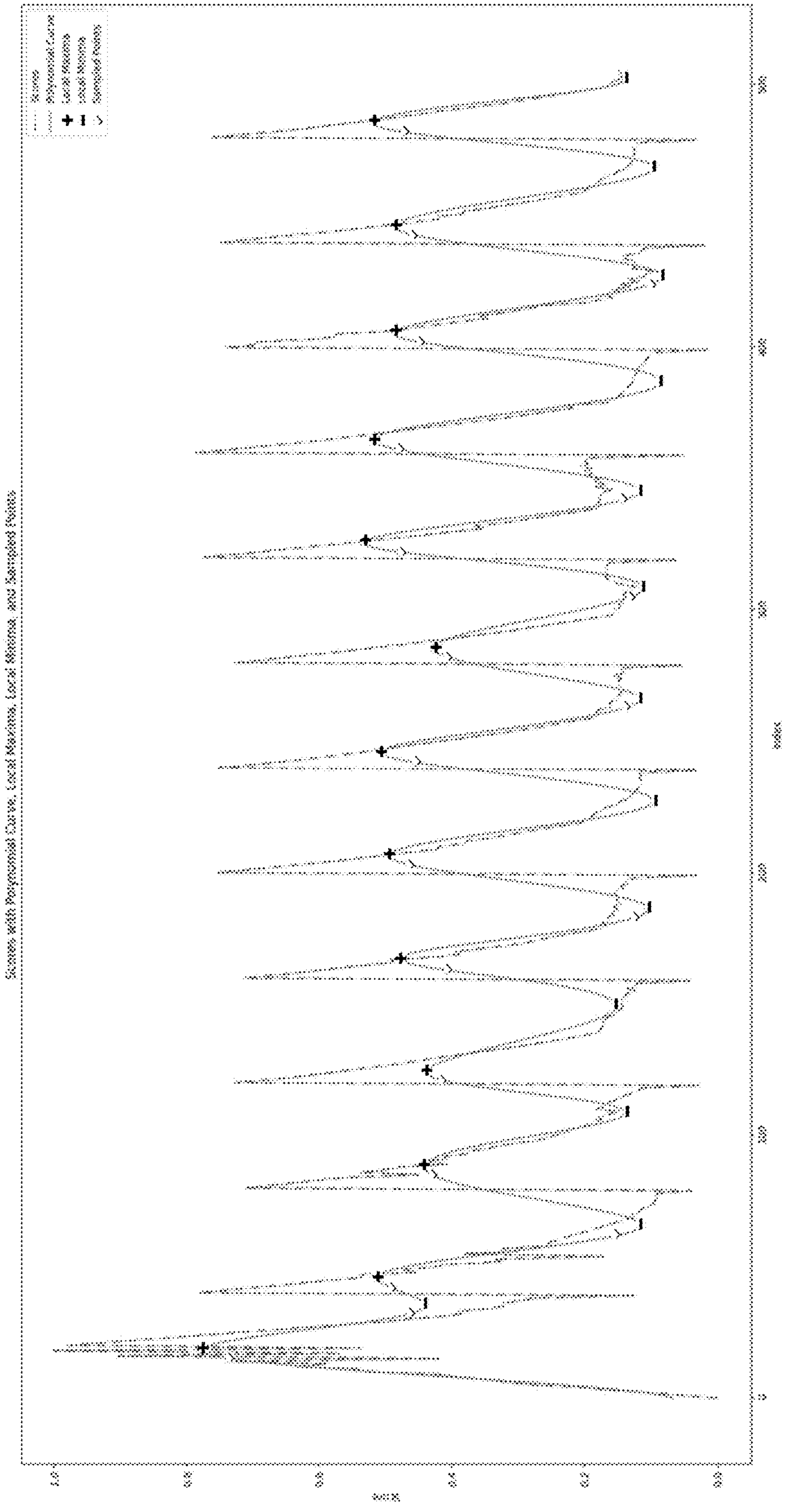
FIG. 15 is a graph depicting cumulative scores generated for a series of frames, according to some examples described herein.

Turning now to FIG. 15, one example of a graph of composite scores of a series of frames is illustrated. As shown in FIG. 15, the x-axis represents an index value of a frame, and the y-axis represents a composite score. The composite score values may increase or decrease based on the content of each frame. As shown by the graph, the reference frame (which may be compared to itself) has a composite score of 0 and the remaining composite scores ranged slightly above 0 to approximately 1. As also shown in the graph 1500, the heaviest movement occurred near frame 25 and substantially regular, periodic movement occurred thereafter within the series. Further illustrated in FIG. 15 is a polynomial curve fitted to the composite score values. Attributes, such as slope, local maxima, local minima, and points marking sampled frames of interest for subsequent procedures, are shown. In some examples, frames temporally proximal to (within 1 second, 2 seconds, etc.—before or after) local maxima and minima may be selected as frames of interest.

Figure 16:
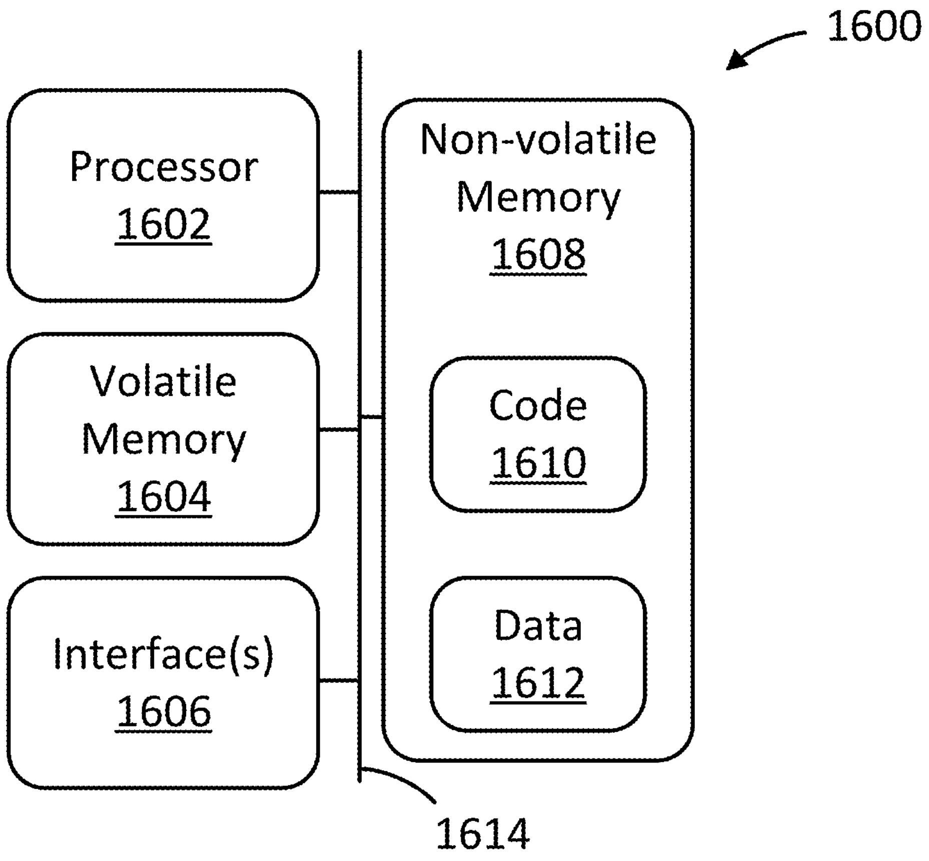
FIG. 16 is a schematic diagram of a computing device, according to some examples described herein.

Turning now to FIG. 16, a computing device 1600 is illustrated schematically. As shown in FIG. 16, the computing device includes at least one processor 1602, volatile memory 1604, one or more interfaces 1606, non-volatile memory 1608, and an interconnection mechanism 1614. The non-volatile memory 1608 may be encoded with or otherwise include code 1610 and at least one data store 1612.

In some examples, the non-volatile (non-transitory) memory 1608 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1610 stored in the non-volatile memory can include an operating system and one or more applications or programs that are configured to execute under the operating system. Alternatively or additionally, the code 1610 can include specialized firmware and embedded software that is executable without dependence upon a commercially available operating system. Regardless, execution of the code 1610 can result in manipulated data that may be stored in the data store 1612 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing with the example of FIG. 16, the processor 1602 can be one or more programmable processors to execute one or more executable instructions, such as a computer program specified by the code 1610, to control the operations of the computing device 1600. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1604) and executed by the circuitry. In some examples, the processor 1602 is a digital processor, but the processor 1602 can be analog, digital, or mixed. As such, the processor 1602 can execute the function, operation, or sequence of operations using digital values and/or using analog signals. In some examples, the processor 1602 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1602 that are multicore can provide functionality for parallel, simultaneous execution of instructions or for parallel, simultaneous execution of one instruction on more than one piece of data.

Continuing with the example of FIG. 16, prior to execution of the code 1610 the processor 1602 can copy the code 1610 from the non-volatile memory 1608 to the volatile memory 1604. In some examples, the volatile memory 1604 includes one or more static or dynamic random access memory (RAM) chips and/or cache memory (e.g. memory disposed on a silicon die of the processor 1602). Volatile memory 1604 can offer a faster response time than a main memory, such as the non-volatile memory 1608.

Through execution of the code 1610, the processor 1602 can control operation of the interfaces 1606. The interfaces 1606 can include network interfaces. These network interfaces can include one or more physical interfaces (e.g., a radio, an ethernet port, a USB port, etc.) and a software stack including drivers and/or other code 1610 that is configured to communicate with the one or more physical interfaces to support one or more LAN, PAN, and/or WAN standard communication protocols. The communication protocols can include, for example, TCP/IP and UDP among others. As such, the network interfaces enable the computing device 1600 to access and communicate with other computing devices via a computer network.

The interfaces 1606 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1610 that is configured to communicate with the user input and/or output devices. As such, the user interfaces enable the computing device 1600 to interact with users to receive input and/or render output. This rendered output can include, for instance, one or more GUIs including one or more controls configured to display output and/or receive input. The input can specify values to be stored in the data store 1612. The output can indicate values stored in the data store 1612.

Continuing with the example of FIG. 16, the various features of the computing device 1600 described above can communicate with one another via the interconnection mechanism 1614. In some examples, the interconnection mechanism 1614 includes a communications bus.

Various innovative concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Descriptions of additional examples follow. Other variations will be apparent in light of this disclosure.

Example 1 is a method comprising identifying at least one sequence of frames within a series of frames, determining, for individual frames within the a sequence, motion between the individual frames and at least one other frame prior to the individual frames in the sequence, selecting at least one frame of the individual frames based on the motion, and assigning the at least one selected frame to represent at least a portion of the sequence of frames.

Example 2 is the method of example 1, further comprising determining motion between frames in the series, wherein identifying the at least one sequence includes identifying a plurality of sequences of frames based on quantifications of the motion between the frames in the series.

Example 3 is the method of example 2, wherein identifying the plurality of sequences includes calculating a motion density between consecutive frames in the series.

Example 4 is the method of any of the preceding examples, further comprising generating first scores for the individual frames based on the determined motion between the individual frames and the one or more other frames.

Example 5 is the method of example 4, wherein selecting the at least one frame includes selecting the at least one frame based on the first scores.

Example 6 is the method of example 5, wherein determining the motion between the individual frames and the one or more other frames includes determining, for each frame within the at least one sequence, motion between the frame and every other frame with a lower ordinal value in the at least one sequence.

Example 7 is The method of example 6, wherein generating the first scores for the individual frames includes calculating, for each frame within the at least one sequence, an amount of motion based on the motion between the frame and every other frame with a lower ordinal value in the at least one sequence.

Example 8 is the method of any of the preceding examples, further comprising rendering, via a user interface, the at least one frame.

Example 9 is the method of any of the preceding examples, further comprising classifying an event depicted in the series based on the at least one frame.

Example 10 is the method of example 9, further comprising generating second scores for the individual frames based on the event.

Example 11 is The method of example 10, further comprising generating first scores for the individual frames based on the determined motion between the individual frames and the one or more other frames, and generating third scores for the individual frames based on the first scores and the second scores of each frame.

Example 12 is a method comprising identifying at least one sequence of frames within a series of frames, calculating, for individual frames within the sequence, respective changes in pixels between the individual frames and every other frame prior to the individual frames in the sequence, selecting at least one frame of the sequence based on the respective changes, and assigning the at least one selected frame to represent the sequence of frames.

Example 13 is the method of example 12, further comprising calculating changes in pixels between frames in the series, wherein identifying the sequence includes identifying a plurality of sequences of frames based on the changes in pixels between the frames in the series.

Example 14 is the method of example 13, wherein calculating changes in pixels includes determining motion between frames in the series, and identifying the plurality of sequences based on the changes in pixels includes identifying the plurality of sequences based on quantifications of the motion.

Example 15 is the method of example 14, wherein identifying the plurality of sequences based on the quantifications of motion includes calculating a motion density between consecutive frames in the series.

Example 16 is the method of any of examples 12-15, further comprising generating first scores for the individual frames based on the respective changes.

Example 17 is the method of example 16, wherein selecting the at least one frame includes selecting the at least one frame based on the respective first scores.

Example 18 is the method of example 17, wherein calculating the respective changes in pixels between the individual frames and the one or more other frames includes calculating, for each frame within the sequence, respective changes in pixels between the frame and every other frame with a lower ordinal value in the sequence.

Example 19 is The method of example 18, wherein generating the respective first scores for the individual frames includes calculating, for each frame within the sequence, an amount of changes in pixels based on the respective changes in pixels between the frame and every other frame with a lower ordinal value in the sequence.

Example 20 is the method of any of examples 12-19, further comprising rendering, via a user interface, the at least one frame.

Example 21 is the method of example 20, further comprising classifying an event depicted in the series based on the at least one frame.

Example 22 is the method of example 21, further comprising generating a second score based on the event and/or a respective change in pixels calculated for the at least one frame.

Example 23 is the method of example 22, further comprising generating first scores for the individual frames based on the respective changes, generating third scores for the individual frames based on the first scores and the second scores of each frame; and selecting at least one frame further based on the third scores.

Example 24 is a system comprising an image capture device configured to capture a series of frames; and a processor configured to interoperate with the image capture device to identify at least one sequence of frames within the series of frames, determine, for individual frames within the sequence of frames, motion between the individual frames and at least one other frame prior to the individual frames in the sequence, select at least one frame of the individual frames based on the determined motion, and assign the at least one selected frame to represent at least a portion of the sequence of frames.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

The invention claimed is:

1. A method comprising:

identifying at least one sequence of frames within a series of frames, the at least one sequence of frames including a reference frame, and at least two other frames prior to the reference frame;

determining motion based on a comparison of the reference frame to the at least two other frames;

selecting at least one frame of the at least one sequence of frames based on the motion; and assigning the at least one selected frame to represent at least a portion of the at least one sequence of frames.

2. The method of claim 1, further comprising determining motion between frames in the series, wherein identifying the at least one sequence includes identifying a plurality of sequences of frames based on quantifications of the motion between the frames in the series.

3. The method of claim 2, wherein identifying the plurality of sequences includes calculating a motion density between consecutive frames in the series.

4. The method of claim 1, further comprising calculating a score for the reference frame based on the determined motion.

5. The method of claim 4, wherein selecting the at least one frame includes selecting the at least one frame based on the score.

6. The method of claim 5, wherein determining the motion includes determining motion between the reference frame and every other frame with a lower ordinal value in the at least one sequence.

7. The method of claim 6, further comprising calculating scores for each frame of the at least one sequence of frames based on a comparison of each frame of the at least one sequence to each of at least two other frames with a lower ordinal value in the series of frames.

8. The method of claim 1, further comprising rendering, via a user interface, the at least one frame.

9. The method of claim 1, further comprising classifying an event depicted in the reference frame.

10. The method of claim 9, further comprising generating a score for the reference frame based on the classification of the event.

11. The method of claim 10, further comprising:

calculating first scores for each frame of the at least one sequence of frames based on a comparison of each frame of the at least one sequence to each of at least two other frames with a lower ordinal value in the series of frames;

generating second scores for each frame of the at least one sequence of frames based on classifying an event depicted in each frame; and producing third scores for each frame of the at least one sequence of frames based on the first scores and the second scores of each frame; and selecting the at least one frame based on the third scores.

12. A method comprising:

identifying at least one sequence of frames within a series of frames, the at least one sequence of frames including a reference frame;

calculating changes in pixels between the reference frame and every other frame prior to the reference frame in the at least one sequence;

selecting at least one frame of the at least one sequence of frames based on the calculated changes; and assigning the at least one selected frame to represent the at least one sequence of frames.

13. The method of claim 12, further comprising calculating changes in pixels between frames in the series, wherein identifying the at least one sequence includes identifying a plurality of sequences of frames based on the changes in pixels between the frames in the series.

14. The method of claim 13, wherein:

calculating changes in pixels includes determining motion between frames in the series; and identifying the plurality of sequences based on the changes in pixels includes identifying the plurality of sequences based on quantifications of the motion.

15. The method of claim 14, wherein identifying the plurality of sequences based on the quantifications of motion includes calculating a motion density between consecutive frames in the series.

16. The method of claim 12, further comprising calculating a score for each frame of the sequence of frames based on calculating, for each frame of the sequence, changes in pixels with respect to each prior frame of the sequence.

17. The method of claim 16, wherein selecting the at least one frame includes selecting the at least one frame based on scores including the score for each frame.

18. The method of claim 16, wherein calculating the changes in pixels includes calculating changes in pixels between the frame and every other frame in the sequence.

19. The method of claim 18, wherein calculating the scores for the frames includes calculating, for each frame within the at least one sequence, an amount of changes in pixels based on the changes in pixels between the frame and every other frame in the at least one sequence.

20. The method of claim 12, further comprising rendering, via a user interface, the at least one frame.

21. The method of claim 20, further comprising classifying an event depicted in the reference frame.

22. The method of claim 21, further comprising generating a score for the reference frame based on the classification of the event.

23. The method of claim 22, further comprising:

calculating first scores for each frame of the at least one sequence of frames based on determining changes in pixels between each frame of the at least one sequence of frames and every other prior frame;

generating second scores for each frame of the at least one sequence of frames based on classifying an event depicted in each frame;

calculating third scores for each frame of the at least one sequence of frames based on the first scores and the second scores of each frame; and selecting the at least one frame further based on the third scores.

24. A system comprising:

an image capture device configured to capture a series of frames; and a processor configured to interoperate with the image capture device to identify at least one sequence of frames within the series of frames the at least one sequence of frames including a reference frame, and at least two other frames prior to the reference frame, determine motion based on a comparison of the reference frame to the at least two other frames, select at least one frame of the at least one sequence of frames based on the determined motion, and assign the at least one selected frame to represent at least a portion of the at least one sequence of frames.

* * * * *